(12) United States Patent
Bauer et al.

(10) Patent No.: US 9,202,255 B2
(45) Date of Patent: Dec. 1, 2015

(54) IDENTIFYING MULTIMEDIA OBJECTS BASED ON MULTIMEDIA FINGERPRINT

(71) Applicant: Dolby Laboratories Licensing Corporation, San Francisco, CA (US)

(72) Inventors: Claus Bauer, Beijing (CN); Lie Lu, Beijing (CN); Mingqing Hu, Beijing (CN)

(73) Assignee: Dolby Laboratories Licensing Corporation, San Francisco, CA (US)

(*) Notice: Subject to any disclaimer, the term of this patent is extended or adjusted under 35 U.S.C. 154(b) by 158 days.

(21) Appl. No.: 13/854,276

(22) Filed: Apr. 1, 2013

(65) Prior Publication Data
US 2013/0279740 A1    Oct. 24, 2013

Related U.S. Application Data

(60) Provisional application No. 61/625,889, filed on Apr. 18, 2012.

(51) Int. Cl.
*G06T 1/00* (2006.01)
*G06K 9/00* (2006.01)
(Continued)

(52) U.S. Cl.
CPC ........ *G06T 1/0021* (2013.01); *G06F 17/30023* (2013.01); *G06K 9/00744* (2013.01); *G06K 9/6292* (2013.01); *G06F 17/30247* (2013.01); *G06F 17/30743* (2013.01); *G06F 17/30784* (2013.01)

(58) Field of Classification Search
CPC ............ G06T 1/0021; G06K 9/00744; G06K 9/6292; G06F 17/30023; G06F 17/30247; G06F 17/30743; G06F 17/30784
See application file for complete search history.

(56) References Cited

U.S. PATENT DOCUMENTS 7,672,939 B2 *   3/2010   Burges ................... 707/999.005
7,747,582 B1      6/2010   Kaminski, Jr.
(Continued)

FOREIGN PATENT DOCUMENTS

WO    02/065782      8/2002
WO    2007/080133   7/2007

OTHER PUBLICATIONS

Guo et al., "Content-based audio classification and retrieval by support vector machines", 2003, Neural Networks, IEEE Transactions on, vol. 14, Iss:1, 209-215.*

(Continued)

*Primary Examiner* — Katrina Fujita

(57) ABSTRACT

Embodiments of identifying multimedia objects based on multimedia fingerprints are provided. Query fingerprints are derived from a multimedia object according to differing fingerprint algorithms. For each fingerprint algorithm, decisions are calculated through at least one classifier corresponding to the fingerprint algorithm based on the query fingerprint and reference fingerprints, the reference fingerprints being derived from reference multimedia objects according to the same fingerprint algorithm. Each of the decisions indicates a possibility that the query fingerprint and the reference fingerprint are not derived from the same multimedia content. For each of the reference multimedia objects, a distance is calculated as a weighted sum of the decisions relating to the reference fingerprints. The multimedia object is identified as matching the reference multimedia object with the smallest distance less than a threshold.

22 Claims, 5 Drawing Sheets

(51) Int. Cl.
  *G06K 9/62* (2006.01)
  *G06F 17/30* (2006.01)

(56) References Cited

U.S. PATENT DOCUMENTS

| | | | | |
|---|---|---|---|---|
| 7,853,438 | B2* | 12/2010 | Caruso et al. | 702/190 |
| 8,145,656 | B2* | 3/2012 | Shatz et al. | 707/758 |
| 8,266,142 | B2* | 9/2012 | Jiang et al. | 707/725 |
| 8,312,051 | B2* | 11/2012 | Jiang et al. | 707/797 |
| 8,468,183 | B2* | 6/2013 | Cheung | 708/200 |
| 8,805,827 | B2* | 8/2014 | Bhagavathy et al. | 707/723 |
| 8,892,570 | B2* | 11/2014 | Bauer | 707/743 |
| 8,965,863 | B1* | 2/2015 | Kulkarni et al. | 707/704 |
| 2010/0211794 | A1 | 8/2010 | Bilobrov | |

OTHER PUBLICATIONS

Lin et al., "Audio Classification and Categorization Based on Wavelets and Support Vector Machine", 2005, Speech and Audio Processing, IEEE Transactions on, vol. 13, Iss: 5, 644-651.*
Bala et al., "Hybrid Learning Using Genetic Algorithms and Decision Trees for Pattern Classification", 1995, IJCAI conference, Montreal.*
Anguera, X. et al "Multimodal Fusion for Video Copy Detection" Proc. of the 19th ACM International Conference on Multimedia, Jan. 1, 2011, p. 1221, New York, USA.
Tian, Y. et al "A Multimodal Video Copy Detection Approach with Sequential Pyramid Matching" 18th IEEE International Conference on Image Processing, Sep. 11, 2011, pp. 3629-3632.
Saracoglu, A. et al "Content Based Copy Detection with Coarse Audio-Visual Fingerprints" IEEE Seventh International Workshop on Content-Based Multimedia Indexing, Jun. 3, 2009, pp. 213-218.
Ouyang, Jian-Quan et al "Fusing Audio-Visual Fingerprint to Detect TV Commercial Advertisement" Computer and Electrical Engineering, vol. 37, No. 6, Aug. 18, 2011, pp. 991-1008.
Oostveen, J. et al "Feature Extraction and a Database Strategy for Video Fingerprinting" Lecture Notes in Computer Science, vol. 2314, Mar. 11, 2002, pp. 117-128.
Cano, P. et al. "A Review of Algorithms for Audio Fingerprinting" IEEE, MMSP 2002.
Haitsma, J. et al. "Robust Audio Hashing for Content Identification", Int. Workshop on Content Based Multimedia Indexing, Brescia, Italy, Sep. 19-21, 2001.
Allamanche, E. et al. "Content-Based Identification of Audio Materialusing MPEG-7 Low Level Description", Proc. of ISMIR 2001.
Kurth, F. et al. "Identification of Highly Distorted Audio Material for Querying Large Scale Databases" in Proc. AES 112th Int. Conv., May 2002.
Burges, C. et al. "Extracting Noise-Robust Features from Audio Data" Proc. of ICASSP 2002.
Seo, J.S. et al. "A Robust Image Fingerprinting System Using the Radon Transform" Signal Processing: Image Communication, vol. 19, Issue 4, Apr. 2004, pp. 325-339.
Lefbvre, F. et al. "A Robust Soft Hash Algorithm for Digital Image Signature" EUSIPCO 2002.
Swaminathan, A. et al. "Image Hashing Resilient to Geometric and Filtering Operations" IEEE MMSP 2004.
Mavandadi, S. et al. "Rotation Invariance in Images" Proc. of ICASSP 2007.
Lu, C. et al. "Robust Mesh Based Hashing for Detection and Tracing of Images" Proc. of ICME 2004.
Celentano, Augusto, "An FFT Based Technique for Image Signature Generation" SPIE 1997.
Cheung, Sen-Ching et al. "Efficient Video Similarity Measurement with Video Signature", IEEE Transactions on CSVT 2003.
Cheung, S.S. et al. "Estimation of WebVideo Multiplicity" SPIE 2000.
Skrepth, C.J. et al. "Robust Hash Functions for Visual Data: An Experiment Comparison" Lectures Notes in Computer Science, 2003, vol. 2652, pp. 986-993.
Venkatesan, R. et al. "Robust Image Hashing" ICIP, 2000.
Schneider, M. et al. "A Robust Content Based Digital Signature for Image Authentication" ICIP 1996.
Mihcack, M.K. et al. New Iterative Geometric Methods for Robust Perceptual Image Hashing, Lectures Notes in Computer Science, 2001.
Monga, V. et al. "Robust Perceptual Image Hashing Using Feature Points" ICIP 2004.
Johnson, M. et al. "Dither-Based Secure Image Hashing Using Distributed Coding" Proc. IEEE International Conference on Image Processing, Spain, Sep. 2003.
http://www.advestigo.com.
http://www.auditude.com.
http://www.civolution.com.
http://www.vobileinc.com.
Radhakrshnan, R. et al. "Audio and Video Signatures for Synchronization" Proc. of ICME 2008.
Freud, Y. et al. "A Short Introduction to Boosting" Journal of Japanese Society for Artificial Intelligence, Sep. 1999, 771-780.
Bauer, C. et al. "Optimal Configuration of Hash Table Based Multimedia Fingerprint Databases Using Weak Bits" Proc. of ICME 2010.
Miller, M.L. et al. "Audio Fingerprinting: Nearest Neighbor Search in High Dimensional Binary Spaces" The Journal of VLSI Signal Processing, vol. 41, No. 3, Nov. 2005.
Haitsma, J. et al. "A Highly Robust Audio Fingerprinting System" Prof. of ISMIR 2002.
Massoudi, A. et al. "A Video Fingerprint Based on Visual Digest and Local Fingerprints" IEEE, Oct. 8-11, 2006, 4 pages.
Larsen, Vegard Andreas, "Combining Audio Fingerprints" NTNU, Master of Science in Computer Science, submitted in Jun. 2008.

* cited by examiner

```
main()
{
  // best_match_fingerprint represents the matching fingerprint
  // best_err_rate represents the threshold p_t
  // node.errs represents the number e of errors until the node
  query = query fingerprint
  best_match_fingerprint = not found
  best_err_rate = expected maximum tolerable error rate
  root.errs = 0 search(root)
} search(node)
{
  if node is leaf
  {
    // calculating actual bit error rate
    err_rate = node.errs / number of bits in fingerprint
    if err_rate < best_err_rate
    {
      best_fingerprint = fingerprint represented by this node
      best_err_rate = err_rate
    }
  }
  else
  {
    for each child of node
      child.errs = hamming distance between bits represented by child
                   and corresponding bits of query
    for each child of node, in increasing order of child.errs
      if best_err_rate > r_t in condition of child.level and child.errs
        search(child)
      else
        return
  }
}
```

Fig. 3

IDENTIFYING MULTIMEDIA OBJECTS BASED ON MULTIMEDIA FINGERPRINT

CROSS REFERENCE TO RELATED APPLICATIONS

This application claims the benefit of priority to related, Provisional U.S. Patent Application No. 61/625,889 filed on 18 Apr. 2012 entitled "Identifying Multimedia Objects Based on Multimedia Fingerprint" by Claus Bauer et. al., hereby incorporated by reference in its entirety.

TECHNICAL FIELD

The present invention relates generally to digital signal processing. More specifically, embodiments of the present invention relate to identifying multimedia objects based on multimedia fingerprints.

BACKGROUND

A multimedia (e.g., audio, video or image) fingerprint is a content-based compact signature that summarizes a multimedia recording. Multimedia fingerprinting technologies have been widely investigated and are increasingly used for various applications since they allow the monitoring of multimedia objects independently of its format and without the need of metadata or watermark embedding. In an example of the applications, given a fingerprint derived from a multimedia recording (e.g., audio or video), a matching algorithm searches a database of fingerprints to find the best match.

Various fingerprint algorithms to derive multimedia fingerprints have been proposed. Multimedia fingerprints can be described as low-bit rate identifiers that uniquely identify even small segments of a multimedia recording such as an audio file, a video file or an image file. A recording or segment which a fingerprint is derived from is also called as a multimedia object hereafter.

Fingerprints based on different fingerprint algorithms differ in the degree of robustness to content modifications and sensitivity to content change. In general, fingerprints are designed in a way that increased fingerprint robustness leads to a decrease in content sensitivity and vice-versa. It is difficult to achieve high robustness and high sensitivity with one fingerprint algorithm.

SUMMARY

According to an embodiment of the invention, a method of identifying a multimedia object is provided. According to the method, query fingerprints $f_{q,1}$ to $f_{q,T}$ are acquired. The query fingerprints are derived from the multimedia object according to fingerprint algorithms $F_1$ to $F_T$ respectively. The fingerprint algorithms $F_1$ to $F_T$ are different from each other, and T>1. For each fingerprint algorithm $F_t$, decisions, are calculated using at least one classifier corresponding to the fingerprint algorithm $F_t$, based on the query fingerprint $f_{q,t}$ and reference fingerprints derived from a plurality of reference multimedia objects according to the fingerprint algorithm $F_t$. Each of the decisions may indicate a possibility that the query fingerprint and the reference fingerprint for calculating the decision are not derived from the same multimedia content. For each of the reference multimedia objects, a distance D is calculated as a weighted sum of the decisions relating to the reference fingerprints derived from the reference multimedia object according to the fingerprint algorithms $F_1$ to $F_T$ respectively. Accordingly, the multimedia object is identified as matching the reference multimedia object with the smallest distance which is less than a threshold $TH_c$. The matching between two multimedia objects means that the multimedia objects can be identified as the same multimedia content.

According to an embodiment of the invention, an apparatus for identifying a multimedia object is provided. The apparatus includes an acquiring unit, a plurality of classifying units, a combining unit and an identifying unit. Each fingerprint algorithm $F_t$ corresponds to at least one of the classifying units. The acquiring unit is configured to acquire query fingerprints $f_{q,1}$ to $f_{q,T}$. The query fingerprints are derived from the multimedia object according to the fingerprint algorithms $F_1$ to $F_T$ respectively. The fingerprint algorithms $F_1$ to $F_T$ are different from each other, and T>1. Each of the classifying units is configured to calculate decisions through a classifier based on the query fingerprint $f_{q,t}$ and reference fingerprints derived from a plurality of reference multimedia objects according to the fingerprint algorithm $F_t$. Each of the decisions may indicate a possibility that the query fingerprint and the reference fingerprint for calculating the decision are not derived from the same multimedia content. The combining unit is configured to, for each of the reference multimedia objects, calculate a distance D as a weighted sum of the decisions relating to the reference fingerprints derived from the reference multimedia object according to the fingerprint algorithms $F_1$ to $F_T$ respectively. The identifying unit is configured to identify the multimedia object as matching the reference multimedia object with the smallest distance which is less than a threshold $TH_c$.

According to an embodiment of the invention, a method of training a model for identifying multimedia objects is provided. This method uses training data provided as samples. According to the method, each of one or more samples includes a training query multimedia object, a training reference multimedia object and a mark indicating whether the training query multimedia object matches the training reference multimedia object or not. For each sample, training query fingerprints are derived from the training query multimedia object according to fingerprint algorithms $F_1$ to $F_G$ respectively. The fingerprint algorithms $F_1$ to $F_G$ are different from each other, and G>1. For each sample, also, training reference fingerprints are derived from the training reference multimedia object according to the fingerprint algorithms $F_1$ to $F_G$ respectively. For each fingerprint algorithm $F_t$, at least one candidate classifier is generated based on the training query fingerprints and the training reference fingerprints derived according to the fingerprint algorithm $F_t$. The candidate classifier is adapted to calculate a decision for any two fingerprints derived according to the fingerprint algorithm $F_t$. The decision may indicate a possibility that the two fingerprints are not derived from the same multimedia content. The model is generated as including a weighted sum of classifiers selected from the candidate classifiers and a threshold $TH_c$ for evaluating the weighted sum, such that the identifying error obtained by applying the model to the training query fingerprints and the training reference fingerprints derived from the samples is minimized. The selected classifiers in the generated model may or may not correspond to more than one fingerprinting algorithm. It is possible, that for some of the fingerprint algorithms no classifier is selected.

According to an embodiment of the invention, an apparatus for training a model for identifying multimedia objects is provided. The apparatus includes a fingerprint calculator and a training unit. The apparatus is provided with a set of samples. Each of one or more samples includes a training query multimedia object, a training reference multimedia object and a mark indicating whether the training query multimedia object matches the training reference multimedia object or not. For each sample, the fingerprint calculator is configured to derive training query fingerprints from the training query multimedia object according to fingerprint algorithms $F_1$ to $F_G$ respectively. The fingerprint algorithms $F_1$ to $F_G$ are different from each other, and $G>1$. The fingerprint calculator is also configured to derive training reference fingerprints from the training reference multimedia object according to the fingerprint algorithms $F_1$ to $F_G$ respectively. For each fingerprint algorithm $F_r$, the training unit is configured to generate at least one candidate classifier based on the training query fingerprints and the training reference fingerprints derived according to the fingerprint algorithm $F_r$. The candidate classifier is adapted to calculate a decision for any two fingerprints derived according to the fingerprint algorithm $F_r$. The decision may indicate a possibility that the two fingerprints are not derived from the same multimedia content. The training unit is further configured to generate the model including a weighted sum of classifiers selected from the candidate classifiers and a threshold $TH_c$ for evaluating the weighted sum, such that the identifying error obtained by applying the model to the training query fingerprints and the training reference fingerprints derived from the samples is minimized. The selected classifiers in the generated model may or may not correspond to more than one fingerprinting algorithm. It is possible, that for some of the fingerprint algorithms no classifier is selected.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which:

FIG. 3 depicts pseudo codes for illustrating an example process of searching a tree according to an example;

DETAILED DESCRIPTION

Figure 1:
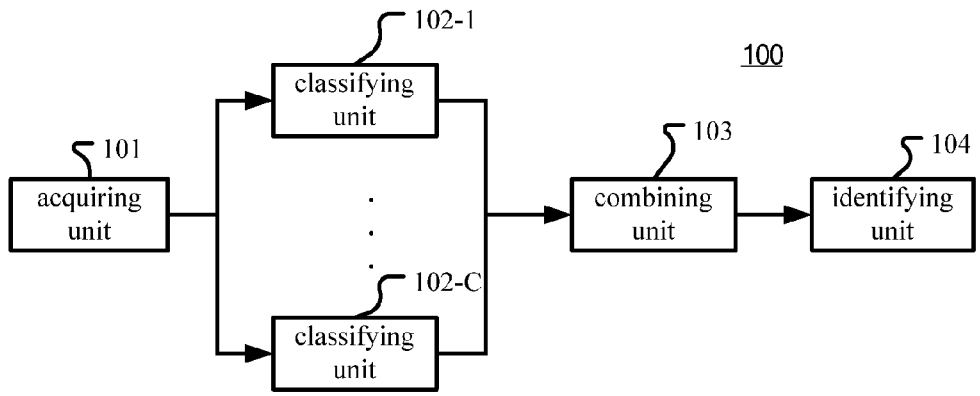
FIG. 1 is a block diagram illustrating an example apparatus for identifying a multimedia object according to an embodiment of the invention.

The embodiments of the present invention are below described by referring to the drawings. It is to be noted that, for purpose of clarity, representations and descriptions about those components and processes known by those skilled in the art but not necessary to understand the present invention are omitted in the drawings and the description.

As will be appreciated by one skilled in the art, aspects of the present invention may be embodied as a system, a device (e.g., a cellular telephone, portable media player, personal computer, television set-top box, or digital video recorder, or any media player), a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating an example apparatus 100 for identifying a multimedia object q according to an embodiment of the invention.

A fingerprint algorithm may capture features, perceptual or imperceptible, of a multimedia object and represent them in a bit sequence called as a fingerprint of the multimedia object. The accuracy of a fingerprint algorithm may be defined in terms of robustness and sensitivity.

The robustness refers to the degree to which the fingerprint is robust against content-preserving modification of the multimedia object from which it is derived according to the fingerprint algorithm. For an audio file, e.g., the modification may be a transcoding of the content. For a video or image file, e.g., the modification may be a rotation or a cropping of the video. The content-preserving modification of the multimedia object does not prevent a human being from recognizing that the modified multimedia object and the unmodified multimedia object contain the same content, and only lead to a relatively small change of the fingerprint.

The sensitivity refers to the degree to which the fingerprint is sensitive to changes of content. If the sensitivity is higher, fingerprints derived from different multimedia contents can differ more significantly.

Various multimedia fingerprint algorithms have been proposed. These fingerprint algorithms differ in robustness to content-preserving modifications and in sensitivity to content changes. In general, fingerprint algorithms are designed in a way that increased fingerprint robustness leads to a decrease in content sensitivity, and vice-versa. Further, fingerprint algorithms may differ by bitrate, i.e., the number of bits needed to uniquely represent a multimedia object under specific robustness and sensitivity requirements.

By using multiple fingerprint algorithms, it is possible to identify a multimedia object as matching or not matching another multimedia object with increased robustness and sensitivity, in view of the fact that the fingerprint algorithms may be an enhancement to each other in either robustness or sensitivity. In most query scenarios, there is a set of multimedia objects which are constant or temporarily constant. If another multimedia object is present, a query request to identify whether the other multimedia object matches one of the multimedia objects from the set of multimedia objects is generated. Because the multimedia objects of the set act as references in the query scenarios, they are also called reference multimedia objects in the present context. Correspondingly, the multimedia object to be identified is also called as a query multimedia object in the present context. Therefore, fingerprints derived from reference multimedia objects and query multimedia objects are also called reference fingerprints and query fingerprints respectively.

As illustrated in FIG. 1, the apparatus 100 includes an acquiring unit 101, a number C>1 of classifying units 102-1 to 102-C, a combining unit 103 and an identifying unit 104.

The acquiring unit 101 is configured to acquire query fingerprints $f_{q,1}$ to $f_{q,T}$ which are derived from the multimedia object q according to fingerprint algorithms $F_1$ to $F_T$ respectively, where T>1. In other words, each query fingerprint $f_{q,t}$, $1 \leq t \leq T$ is derived from the multimedia object q according to the fingerprint algorithm $F_t$. The fingerprint algorithms $F_1$ to $F_T$ are different from each other. In an embodiment of the apparatus 100, the query fingerprints $f_{q,1}$ to $f_{q,T}$, may be derived by the acquiring unit 101. Alternatively, in another embodiment of the apparatus 100, the query fingerprints $f_{q,1}$ to $f_{q,T}$ may be derived at a location such as a client device external to the acquiring unit 101, and the acquiring unit 101 receives the query fingerprints $f_{q,1}$ to $f_{q,T}$ from the location via a connection such as bus, network or application-specific link.

Each fingerprint algorithm $F_t$ may correspond to at least one of the classifying units 102-1 to 102-C. One fingerprint algorithm may correspond to only one classifying unit, or may correspond to more than one classifying unit. In an example, one or more of the fingerprint algorithms $F_1$ to $F_T$ may each correspond to only one classifying unit. In another example, one or more of the fingerprint algorithms $F_1$ to $F_T$ may each correspond to at least two classifying units. In case that a fingerprint algorithm corresponds to a classifying unit, the classifying unit may be applied to fingerprints derived according to the fingerprint algorithm.

There is a set of reference multimedia object $r_1$ to $r_N$. For each reference multimedia object $r_j$ reference fingerprints $f_{r_j,1}$ to $f_{r_j,T}$ are derived from the reference multimedia object $r_t$ according to each fingerprint algorithm $F_t$ of the fingerprint algorithms $F_1$ to $F_T$. Accordingly, each classifying unit 102-$i$, $1 \leq i \leq C$, corresponding to one of the fingerprint algorithms $F_t$, $1 \leq t \leq T$, is configured to calculate decisions $h_t(q,r_j)$, $1 \leq j \leq N$, through a classifier based on the query fingerprint $f_{q,t}$ and the reference fingerprints $f_{r_1,t}$ to $f_{r_N,t}$ derived from the reference multimedia objects $r_1$ to $r_N$ according to the fingerprint algorithm $F_t$. Each decision $h_t(q,r_j)$ indicates a possibility that the query fingerprint $f_{q,t}$ and the reference fingerprint $f_{r_j,t}$ are not derived from the same multimedia content. Consequently, all the classifying units may calculate N×C decisions $h_t(q,r_j)$, where $1 \leq i \leq C$, $1 \leq j \leq N$.

The classifier may be achieved through any algorithm for identifying whether a fingerprint and another fingerprint are derived from the same multimedia content or not. The algorithm includes, but not limited to, identifying algorithms based on machine learning, and identifying algorithms based on searching.

In an example of identifying algorithms based on machine learning, distances are calculated between the fingerprints derived from positive and negative training samples, each of which includes a training query multimedia object, a training reference multimedia object and a mark indicating whether the training query multimedia object matches the training reference multimedia object. A positive sample means that it includes a mark indicating that the training query multimedia object matches the training reference multimedia object, and a negative sample means that it includes a mark indicating that the training query multimedia object does not match the training reference multimedia object. Parameters of the algorithms which can minimize the identifying error are learned from the distances derived from the objects, and therefore, corresponding classifiers are generated. In case of identifying through such a classifier, the distance required by the classifier is calculated from a query fingerprint and a reference fingerprint, and a decision is calculated with the classifier based on the distance. Alternatively, the parameters may be determined experientially, without learning.

In an example of identifying algorithms based on searching, a set of training reference fingerprints are searched to find one or more of them matching a training query fingerprint. Fingerprints may be derived from positive and negative training samples, each of which includes a training query multimedia object, a training reference multimedia object and a mark indicating whether the training query multimedia object matches the training reference multimedia object. Parameters of the algorithms which can minimize the identifying error are learned from the distances derived from the objects, and therefore, corresponding classifiers are generated. In case of identifying through such a classifier, the reference fingerprints are searched to find one or more of them matching a query fingerprint. Therefore, for the reference fingerprint and the query fingerprint found as matching, it is possible to make a decision that the reference fingerprint and the query fingerprint are, or are likely derived from the same multimedia content. For the reference fingerprint and the query fingerprint not found as matching, it is possible to make a decision that the reference fingerprint and the query fingerprint are not, or are not likely derived from the same multimedia content. Alternatively, the parameters may be determined experientially, without selecting by comparison.

In case that at least two classifiers correspond to the same fingerprint algorithm, the classifiers may include classifiers based on the same identifying algorithm but having different parameter configurations (e.g., different thresholds for classifying), and/or classifiers based on different identifying algorithms. Alternatively, each fingerprint algorithms $F_t$ may correspond to only one classifying unit.

As an example of the identifying algorithm, in case of a classifying unit 102-i adopting a classifier corresponding to the fingerprint algorithm $F_t$, a query fingerprint $f_{q,t}$ and a reference fingerprint $f_{r_j,t}$ are derived according to the fingerprint algorithm $F_t$, a distance $d_i(f_{q,t}, f_{r_j,t})$, such as Hamming distance, between the query fingerprint $f_{q,t}$ and the reference fingerprint $f_{r_j,t}$ is calculated. $d_i( )$ is a distance function about two fingerprints derived according to the fingerprint algorithm $F_t$. Then the decision $h_i(q,r_j)$ is calculated as $$h_i(q, r_j) = \begin{cases} 1 & \text{if } d_i(f_{q,t}, f_{r_j,t}) > Th_i \\ 0 & \text{if } d_i(f_{q,t}, f_{r_j,t}) \leq Th_i \end{cases} \quad (1)$$

where 1 indicates that the query fingerprint $f_{q,t}$ and the reference fingerprint $f_{r_j,t}$ are not derived from the same multimedia content, 0 indicates that the query fingerprint $f_{q,t}$ and the reference fingerprint $f_{r_j,t}$ are derived from the same multimedia content, and $Th_i$ is a threshold associated with the classifier.

The decisions may be hard decisions indicating that the query fingerprint and the reference fingerprint are not derived from the same multimedia content (e.g., 1), or that the query fingerprint and the reference fingerprint are derived from the same multimedia content (e.g., 0). The decisions may also be soft decisions indicating a probability that the query fingerprint and the reference fingerprint are not derived from the same multimedia content.

For each reference multimedia object $r_j$, the combining unit 103 is configured to calculate a distance $D_j$ as a weighted sum of the decisions $h_1(q,r_j)$ to $h_C(q,r_j)$ relating to the reference fingerprints $f_{r_j,t}$ to $f_{r_j,T}$ derived from the reference multimedia object $r_j$ according to the fingerprint algorithms $F_1$ to $F_T$ respectively, that is, $$D_j = \sum_{i=1}^{C} w_i h_i(q, r_j) \quad (2)$$

where $w_i$ is the weight for the decision $h_i(q,r_j)$. In an example, all the weights $w_i$ may be equal. In another example, the weights $w_i$ may be pre-trained based on training samples.

For the N reference multimedia objects, N distances $D_1$ to $D_N$ are calculated. The identifying unit 104 is configured to identify the multimedia object q as matching the reference multimedia object x with the smallest distance $D_x$ of the distances $D_1$ to $D_N$, which is less than a threshold $TH_c$.

Figure 2:
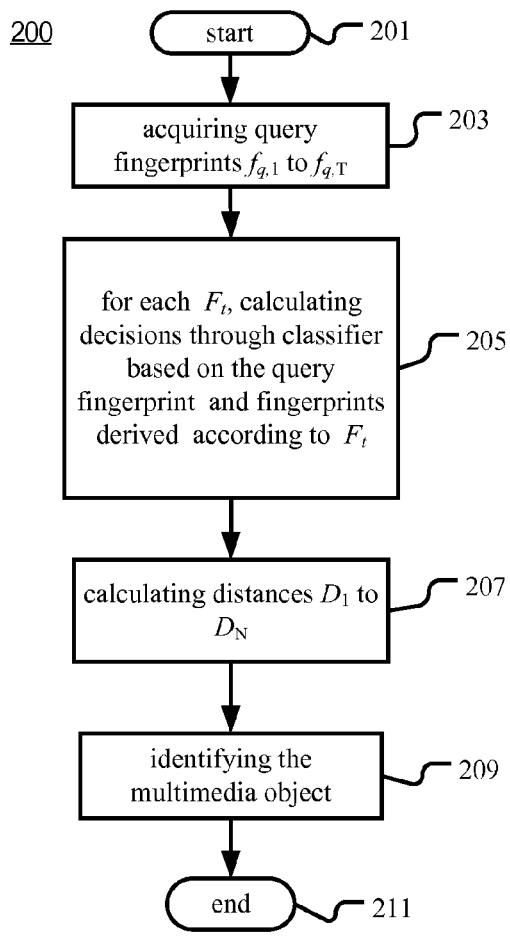
FIG. 2 is a flow chart illustrating an example method of identifying a multimedia object according to an embodiment of the invention.

FIG. 2 is a flow chart illustrating an example method 200 of identifying a multimedia object q (also called query multimedia object q hereafter) according to an embodiment of the invention.

As illustrated in FIG. 2, the method 200 starts from step 201. At step 203, query fingerprints $f_{q,1}$ to $f_{q,T}$ are acquired. The query fingerprints $f_{q,1}$ to $f_{q,T}$ are derived from the query multimedia object q according to fingerprint algorithms $F_1$ to $F_T$ respectively. In other words, each query fingerprints $f_{q,t}$ is derived from the query multimedia object q according to the fingerprint algorithm $F_t$. The fingerprint algorithms $F_1$ to $F_T$ are different from each other. In an embodiment of the method 200, the query fingerprints $f_{q,1}$ to $f_{q,T}$ may be derived at step 203. Alternatively, in another embodiment of the method 200, the query fingerprints $f_{q,1}$ to $f_{q,T}$ may be derived at a location such as a client device, and at step 203, the query fingerprints $f_{q,1}$ to $f_{q,T}$ are received from the location via a connection such as bus, network or link.

At step 205, for each fingerprint algorithm $F_t$, decisions $h_i(q,r_1)$ to $h_i(q,r_N)$ are calculated using at least one classifier corresponding to the fingerprint algorithm $F_t$ based on the query fingerprint $f_{q,t}$ and reference fingerprints $f_{r_1,t}$ to $f_{r_N,t}$ derived from a plurality of reference multimedia objects $r_1$ to $r_N$ according to the fingerprint algorithm $F_t$. Each fingerprint algorithm $F_t$ may correspond to at least one classifier. One fingerprint algorithm may correspond to only one classifying unit, or may correspond to more than one classifying unit. In an example, one or more of the fingerprint algorithms $F_1$ to $F_T$ may each correspond to only one classifier. In another example, one or more of the fingerprint algorithms $F_1$ to $F_T$ may each correspond to at least two classifiers. In case that a fingerprint algorithm corresponds to a classifier, the classifier may be applied to fingerprints derived according to the fingerprint algorithm. The decision $h_i(q,r_j)$ indicates a possibility that the query fingerprint $f_{q,t}$ and the corresponding reference fingerprint $f_{r_j,t}$ are not derived from the same multimedia content. Accordingly, N×C decisions $h_i(q,r_j)$ are calculated, where $1 \le i \le C$, $1 \le j \le N$. The classifier may be achieved through any algorithm for identifying whether a fingerprint and another fingerprint are derived from the same multimedia content or not. The algorithm includes, but not limited to, identifying algorithms based on machine learning, and identifying algorithms based on searching. In case that at least two classifiers correspond to the same fingerprint algorithm, the classifiers may include classifiers based on the same identifying algorithm but having different parameter configurations (e.g., different thresholds for classifying), and/or classifiers based on different identifying algorithms. Alternatively, each fingerprint algorithms $F_t$ may correspond to only one classifier. The decisions may be hard decisions indicating that the query fingerprint and the reference fingerprint are not derived from the same multimedia content, or that the query fingerprint and the reference fingerprint are derived from the same multimedia content. The decisions may also be soft decisions indicating a probability that the query fingerprint and the reference fingerprint are not derived from the same multimedia content.

At step 207, for each reference multimedia object $r_j$, a distance $D_j$ is calculated as a weighted sum of the decisions $h_1(q,r_j)$ to $h_C(q,r_j)$ relating to the reference fingerprints $f_{r_j,1}$ to $f_{r_j,T}$ derived from the reference multimedia object $r_j$ according to the fingerprint algorithms $F_1$ to $F_T$ respectively as described in equation (2).

At step 209, the multimedia object q is identified as matching the reference multimedia object x with the smallest distance $D_x$ of the distances $D_1$ to $D_N$, which is less than a threshold $TH_c$.

The method 200 ends at step 211.

According to the apparatus 100 and the method 200, usage of more than one fingerprint algorithm can be beneficial to support specific applications. In particular, different fingerprint algorithms are characterized by different trade-offs between robustness and sensitivity. Combining these fingerprints with different performance characteristics can be useful to derive more intelligent decisions and more accurate information for the target applications. In particular, different fingerprint algorithms with different robustness and sensitivity characteristics can be used jointly to offset each other's performance weaknesses and arrive at a more reliable decision.

The apparatus 100 and the method 200 may be applied in various applications. In an example application, the reference multimedia objects include those corresponding to various contents. The apparatus 100 and the method 200 can be applied to find the reference multimedia object having the same content with a query multimedia object. In another example application, the reference multimedia objects include those corresponding to the same content but at different positions in the content. The apparatus 100 and the method 200 can be applied to find the reference multimedia object matching a query multimedia object, so as to determine the position in the content which is synchronous with the query multimedia object.

In a further embodiment (Embodiment A) of the apparatus 100 or the method 200, for each of a subset or the whole set of the classifiers, in the corresponding classifying unit 102-i, or at step 205, the decisions $h_i(q,r_1)$ to $h_i(q,r_N)$ are calculated through the classifier based on the query fingerprint $f_{q,t}$ and the reference fingerprints $f_{r_1,t}$ to $f_{r_N,t}$. In the calculation, a tree is searched to find at least one leaf node having an bit error rate between the query fingerprint and the reference fingerprint represented by the leaf node less than a maximum tolerable error rate. The reference fingerprints have a fixed length L=S×K bits, and S and K are positive integers. The tree is a $2^K$-ary tree having S levels, and each node in the l-th level, $0 \le l \le S$, represents a bit sequence of K×l bits, and therefore, the reference fingerprints can be represented by corresponding leaf nodes in the tree. Each level has a look-up table. For a node of the level reached during the searching, the look-up table defines an estimated bit error rate $r_t$ between the query fingerprint and its closest reference fingerprint under the reached node, such that the probability of observing at least E errors between b bits represented by the reached node and first b bits of the query fingerprint is greater than a threshold $p_t$.

The look-up table may be computed in advance based on the following observation. During searching the tree, if any node at level l is reached, b bits of the query fingerprint can be examined against the b bits represented by the node, and e errors may be seen between the first b bits of the query fingerprint and the first b bits represented by the node. Then, the probability p(e|b,r) of observing e errors in b bits with a bit error rate (BER) of r is a certain distribution (e.g., binomial distribution, assuming that the bit errors are uniformly distributed over the entire fingerprint). The probability p' of observing at least E errors in b bits is simple one minus the cumulative probability of p(e|b,r) where e ranges from 0 to E. In this way, having observed e errors in b bits, it is possible to calculate the bit error rate $r_t$, between the query fingerprint and the closest reference fingerprint under the node, such that the probability of observing at least e errors is greater than a threshold $p_t$. That is, $r_t$ is such that p'=$p_t$. This means that if e errors have been observed in b bits, it is reasonably certain that the eventual overall bit error rate will be greater than $r_t$. During the searching, if a non-leaf node is reached, e and b may be determined for the node, and corresponding $r_t$ may be found in the look-up table. If $r_t$ is greater than the threshold $p_t$, this means that no reference fingerprint having a bit error rate less than the threshold $p_t$ may be found under the node, and therefore, this node can be excluded from the searching scope. The threshold $p_t$ is the maximum tolerable error rate.

Also in the calculation, the decisions $h_i(q,r_1)$ to $h_i(q,r_N)$ are calculated by deciding that only the reference fingerprints represented by leaf nodes, which are found during the search, and the query fingerprint are derived from the same multimedia content. For example, if a found leaf node represents a reference fingerprint $f_{r_x,t}$, the decision $h_i(q,r_x)$ is calculated as indicating that the reference fingerprint $f_{r_x,t}$ and the query fingerprint $f_{q,t}$ are derived from the same multimedia content. For the reference fingerprint represented by a leaf node which is not found during the search, the corresponding decision is calculated as indicating that the reference fingerprint and the query fingerprint are not derived from the same multimedia content. In a different example, not all, but only a subset of all the reference fingerprints represented by leaf nodes found in the search are decided as being derived from the same multimedia content as the query fingerprint. Different methods based on thresholds or absolute number of candidates can be used to decide how to determine the subset.

Depending on specific performance requirements, there can be various stop criteria for the searching. In a first example, the searching may stop upon finding the first leaf node having an bit error rate less than the threshold $p_t$. In this case, the at least one leaf node found in the search includes only one leaf node. In a second example, the searching may stop upon finding the leaf node having the smallest bit error rate less than the threshold $p_t$. In a third example, the searching may stop upon finding all the leaf nodes or a predetermined number of leaf nodes having bit error rates less than the threshold $p_t$.

FIG. 3 depicts pseudo codes for illustrating an example process of the searching according to the second example. Function main( ) is the main process of the search. For function search(node), the variable "node" is an object having an attribute "errs" for representing e, and an attribute "level" for representing b.

In the second example described above, at least two leaf nodes having the smallest bit error rate may be found. In this case, it is possible to select one of the leaf nodes with a probability as the searching result. For example, if the probability is 0.5, the leaf node is selected randomly, if the probability is less than 0.5, the first node is selected, and if the probability is greater than 0.5, the last node is selected.

In a further embodiment (Embodiment B) of the apparatus 100 or the method 200, for each of a subset or the whole set of the classifiers, the fingerprints for the classifier are derived as hash values, and in the corresponding classifying unit, or at step 205, the decisions $h_i(q,r_1)$ to $h_i(q,r_N)$ are calculated through the classifier based on the query fingerprint and the reference fingerprints. In the calculation, a distance $d_i(f_{q,t}, f_{r_j,t})$ between the query fingerprint $f_{q,t}$ and each $f_{r_j,t}$ of the reference fingerprints $f_{r_1,t}$ to $f_{r_N,t}$ is calculated, and the decisions $h_i(q,r_1)$ to $h_i(q,r_N)$ are calculated by deciding that at least one of the reference fingerprints $f_{r_1,t}$ to $f_{r_N,t}$ with the distance $d_i$ less than a threshold $TH_i$ and the query fingerprint $f_{q,t}$ are derived from the same multimedia content. Depending on specific performance requirements, the at least one reference fingerprint which is decided to be derived from the same multimedia content with the query fingerprint may be determined according to various criteria. In an example, the at least one reference fingerprint may be determined as only the reference fingerprint first found with the distance less than the threshold $TH_i$. In another example, the at least one reference fingerprint may be determined as the reference fingerprint with the smallest distance less than the threshold $TH_i$. In another example, the at least one reference fingerprint may be determined as all the reference fingerprints or a predetermined number of reference fingerprints with the distance less than the threshold $TH_i$.

In a further embodiment (Embodiment C) of the apparatus 100 or the method 200, for each of a subset or the whole set of the classifiers, the fingerprints for the classifier are derived as hash values. Each of the hash values is divided into weak bits and reliable bits. The weak bits are defined as the bits which are likely to flip when the multimedia object, from which the fingerprint is derived, is modified. A modification of the content is defined as a change of the digital presentation (waveform) of the multimedia signal which preserves the perceptually relevant content of the multimedia object. Examples are transcoding, but range change, resampling, specific pre- and post-processing technologies. If a song/video is modified by one of these operations, it might sound/look slightly different, but it is still easily recognized as the same song/video by a human. The weak bits are the bits that flip with a high probability when these modifications are applied. This probability is required to be above a certain threshold and might be determined by experiments and the requirements of the application for which the fingerprints are used.

The reliable bits are less likely to flip as a result of content modification. In the corresponding classifying unit 102-$i$, or at step 205, the decisions $h_i(q,r_1)$ to $h_i(q,r_N)$ are calculated through the classifier based on the query fingerprint and the reference fingerprints. In the calculation, a distance $di(f_{q,t}, f_{r_j,t})$ between the query fingerprint $f_{q,t}$ and each $f_{r_j,t}$ of the reference fingerprints $f_{r_1,t}$ to $f_{r_N,t}$ having the identical reliable bits is calculated, and the decisions $h_i(q,r_1)$ to $h_i(q,r_N)$ are calculated by deciding that at least one of the reference fingerprints $f_{r_1,t}$ to $f_{r_N,t}$ with the distance $d_i$ less than a threshold TH'i and the query fingerprint $f_{q,t}$ are derived from the same multimedia content. Depending on specific performance requirements, the at least one reference fingerprint which is decided to be derived from the same multimedia content with the query fingerprint may be determined according to various criteria. In an example, the at least one reference fingerprint may be determined as only the reference fingerprint first found with the distance less than the threshold TH'i. In another example, the at least one reference fingerprint may be determined as the reference fingerprint with the smallest distance less than the threshold TH'i. In another example, the at least one reference fingerprint may be determined as all the reference fingerprints or a predetermined number of reference fingerprints with the distance less than the threshold TH'i.

In a further embodiment of the apparatus 100 or the method 200, the classifiers may include any combination of the classifiers described in connection with Embodiments A, B and C.

In a further embodiment of the apparatus 100 or the method 200, the query multimedia object q includes a number W of objects which are synchronous with each other, and each of the reference multimedia objects $r_1$ to $r_N$ includes the number W of objects which are synchronous with each other, where W>1. In this case, for each of the W objects in the query multimedia object q and the reference multimedia objects $r_1$ to $r_N$, at least one of the fingerprints is derived from the object according to the same fingerprint algorithm respectively. The W objects may belong to different media classes like audio, video, or image. As an example, the W objects may include an audio object and a video or image object synchronous with each other. Some of the fingerprints may be derived from the audio object, and others may be derived from the video or image object. In this embodiment, fingerprint algorithms suitable for the specific media classes of the objects may be chosen. Combining the results of the different fingerprint algorithms, a more accurate search result can be obtained.

Figure 4:
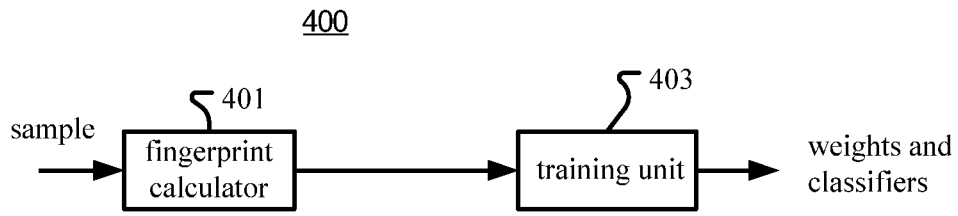
FIG. 4 is a block diagram illustrating an example apparatus for training a model for identifying multimedia objects according to an embodiment of the invention.

FIG. 4 is a block diagram illustrating an example apparatus 400 for training a model for identifying multimedia objects according to an embodiment of the invention.

As illustrated in FIG. 4, the apparatus 400 includes a fingerprint calculator 401 and a training unit 403.

To train the model, a set S of one or more training samples is provided. Each sample includes one training query multimedia object $q_k$ out of training query multimedia objects $q_1$ to $q_M$, one training reference multimedia object $r_j$ out of training reference multimedia objects $r_1$ to $r_U$, and a mark $y_{k,j}$ indicating whether the training query multimedia object $q_k$ matches the training reference multimedia object $r_j$ or not. The samples may include some or all the combinations of the training query multimedia objects and the training reference multimedia objects. It can be appreciated that any two samples are different in their training query multimedia object or their training reference multimedia object.

For each sample, the fingerprint calculator 401 is configured to derive query fingerprints $f_{q_k,1}$ to $f_{q_k,G}$ from the training query multimedia object $q_k$ according to fingerprint algorithms $F_1$ to $F_G$ respectively. The fingerprint algorithms $F_1$ to $F_G$ are different from each other, and G>1. For each sample, the fingerprint calculator 401 is further configured to derive training reference fingerprints $f_{r_j,1}$ to $f_{r_j,G}$ from the training reference multimedia object $r_j$ according to the fingerprint algorithms $F_1$ to $F_G$ respectively.

For each fingerprint algorithm $F_t$, 1≤t≤G, the training unit 403 is configured to generate at least one candidate classifier based on the training query fingerprints and the training reference fingerprints derived according to the fingerprint algorithm $F_t$. The at least one candidate classifier may include only one candidate classifier, or may include more than one candidate classifier. The candidate classifier is adapted to calculate a decision for any two fingerprints derived according to the fingerprint algorithm $F_t$. The decision indicates a possibility that the two fingerprints are not derived from the same multimedia content.

The candidate classifier may be achieved through any algorithm for identifying whether a fingerprint and another fingerprint are derived from the same multimedia content or not. These algorithms include, but are not limited to, identifying algorithms based on machine learning, and identifying algorithms based on searching.

In an example of identifying algorithms based on machine learning, distances are calculated between the fingerprints derived from positive and negative training samples, each of which includes a training query multimedia object, a training reference multimedia object and a mark indicating whether the training query multimedia object matches the training reference multimedia object. Parameters of the algorithms which can minimize the identifying error are learned from the distances, and therefore, corresponding classifiers are generated.

In an example of identifying algorithms based on searching, a set of training reference fingerprints are searched to find one or more of them matching a training query fingerprint. Fingerprints may be derived from positive and negative training samples, each of which includes a training query multimedia object, a training reference multimedia object and a mark indicating whether the training query multimedia object matches the training reference multimedia object. A positive sample means that it includes a mark indicating that the training query multimedia object matches the training reference multimedia object, and a negative sample means that it includes a mark indicating that the training query multimedia object does not match the training reference multimedia object. Parameters of the algorithms which can minimize the identifying error are learned from the distances derived from the objects, and therefore, corresponding classifiers are generated.

In case that at least two candidate classifiers are generated for the same fingerprint algorithm, the candidate classifiers may include candidate classifiers based on the same identifying algorithm but having different parameter configurations (e.g., different thresholds for classifying), and/or candidate classifiers based on different identifying algorithms. Alternatively, each fingerprint algorithms $F_t$ may correspond to only one classifying unit.

In an example of the algorithm for identifying based on equation (1), it is possible to generate the candidate classifier by selecting the threshold $Th_i$ from a plurality of candidate thresholds, such that the identifying error with reference to the training samples is the smallest. The identifying error is generally calculated with an error function. As an example, the error function $\epsilon_i$ is calculated as $$\varepsilon_i = \sum_{\substack{c \in S, \\ h_i(c) \neq y_c}} P(c) \qquad (3)$$

where S represents the set of the samples, P( ) represents a distribution of weights of the samples, $y_c$ represents the mark of sample c, and $h_i$( ) represents a candidate classifier corresponding to fingerprint algorithm $F_1$. In an example, both $h_i$( ) and $y_c$ may take values 0 and 1 (see equation (1)).

In an example (Example A) of the algorithm for identifying by searching a tree as described in connection with the apparatus 100 and the method 200, for the tree, it is possible to provide at least two sets of parameters including K and an initial value of the maximum tolerable error rate are provided. For each different set of parameters, the tree is configured differently and a different tree based classifier can be constructed. The identifying errors of the constructed classifiers can be calculated based on an error function such as equation (3) with reference to the samples. Therefore, the set resulting in the smallest error function is selected to generate the candidate classifier. In case of the second example of the algorithm for identifying by searching a tree as described in connection with the apparatus 100 and the method 200, at least two leaf nodes having the smallest bit error rate may be found. In this case, it is possible to select one of the leaf nodes with a probability as the searching result. For example, if the probability is 0.5, the leaf node is selected randomly, if the probability is less than 0.5, the first node is selected, and if the probability is greater than 0.5, the last node is selected. In this case, in addition to K and the initial value of the maximum tolerable error rate, each set of parameters may also include the probability.

In an example (Example B) of the algorithm for identifying based on the distance between the hash values as described in connection with the apparatus 100 and the method 200, at least two candidate thresholds for calculating the decisions $h_i$( ) may be provided, and one of the candidate threshold resulting in the smallest error function is selected as the threshold $TH_i$ for the candidate classifier.

In an example (Example C) of the algorithm for identifying based on the distance between the hash values having the identical reliable bits as described in connection with the apparatus 100 and the method 200, at least two combinations of a) threshold for calculating the decisions $h_i$( ) and b) division of the fingerprint into weak bits and reliable bits may be provided, and the combination resulting in the smallest error function is selected for the candidate classifier. The division of the fingerprint into weak and reliable bits can be configured by changing the number of weak bits and reliable bits and by changing the method (or pattern) to determine which bits are classified as weak and reliable.

The training unit 403 is further configured to generate the model including a weighted sum of classifiers selected from the candidate classifiers and a threshold $TH_c$ for evaluating the weighted sum, such that the identifying error obtained by applying the model to the training query fingerprints and the training reference fingerprints derived from the samples is minimized. There may be a possibility that in the generated model, the selected classifiers correspond to T>1 fingerprint algorithms. There is also another possibility that in the generated model, the selected classifiers correspond to only one fingerprint algorithm. More than one classifier may correspond to the same fingerprinting algorithm. In order to find $TH_c$, different values of $TH_c$ can be tried out randomly, exhaustively, or find through an optimization algorithm.

In a first example of generating the model, both the classifiers and the weights are generated and selected through an Adaboost method. According to the Adaboost method, several rounds of selection may be performed. At the beginning of each round of selection, each training sample is assigned a probability value (weight). Also, in each round candidate classifiers are generated based on training data. From the candidate classifiers generated in this round, the candidate classifier having the minimum error with reference to the training data is selected, and its weight is determined accordingly. Also, in each round, the distribution of weight of the training data is also updated for generating candidate classifiers in the next round. The Adaboost method can be configured in different ways. In one example, all of the fingerprint algorithms can be used in each round to generate the candidate classifiers. In another example, only a subset of all fingerprint algorithms is be used in each round to generate the candidate classifiers. In this case, the used fingerprint algorithms may be predetermined or selected randomly. The fingerprint algorithms used in different rounds may be identical, different in part or different totally. One or more fingerprint algorithms may be used in one or more rounds. In another example, Adaboost may select each fingerprint at most or exactly once to build a classifier. In this example, if a classifier corresponding to a fingerprint algorithm is selected, this fingerprint algorithm will not be considered in generating candidate classifiers for selection in the next iterations.

Alternatively, in an second example, classifiers included in the model may be predetermined, and the weights of the classifiers may be determined through an Adaboost method. In this scenario, each classifier is considered in only one iteration.

Figure 5:
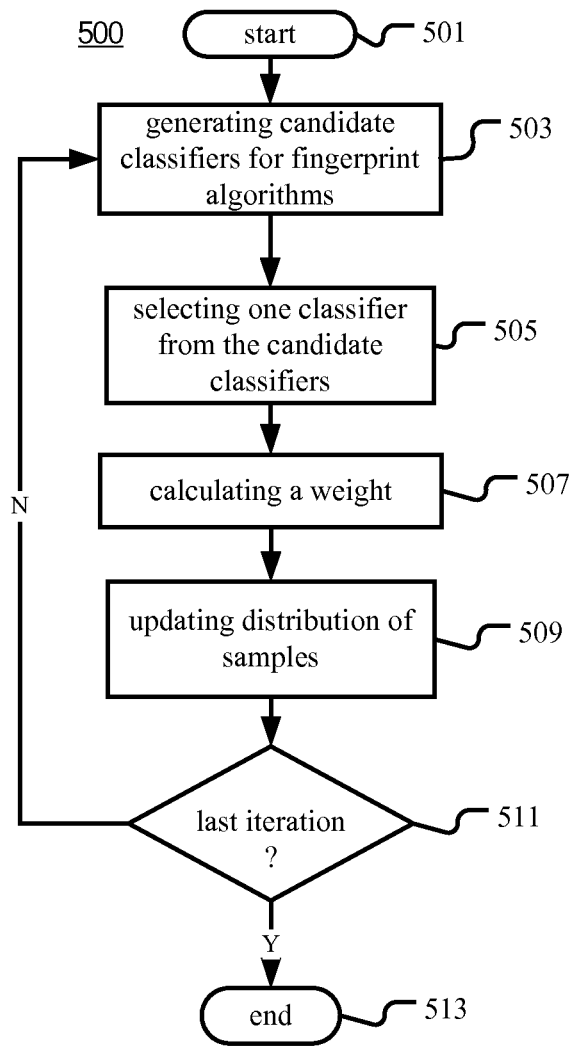
FIG. 5 is a flow chart illustrating an example process of Adaboosting method according to an embodiment of the invention.

FIG. 5 is a flow chart illustrating an example process 500 of the Adaboost method according to an embodiment of the invention.

As illustrated in FIG. 5, the process 500 starts from step 501.

Supposing that there are M training query multimedia objects and U training reference multimedia objects, there is a set S of V=M×U samples. One may choose to use all V training sample as training data for the Adaboost algorithm. Or, one may choose to use a subset of W<V of training sample as training data for the Adaboost algorithm.

Each sample c in the set S includes one of the training query multimedia objects, one of the training reference multimedia objects and a mark $y_c$. Different samples cannot contain both the same training query multimedia object and the same training reference multimedia object. For the s-th iteration of the Adaboost method, the weight of each sample c in the set S is denoted as $P_s(c)$. Initially, the weights of the samples may be set equal, e.g., set to 1/(V) or 1/(W). At step 503, for each fingerprint algorithm $F_t$, at least one candidate classifier $h_i(\ )$ is generated based on the query fingerprints and the corresponding training fingerprints derived from the samples according to the fingerprint algorithm $F_t$. There are multiple ways to generate these classifiers and they depend on the chosen database structure. In particular, databases can be tree based, hash based, or hash based using weak bits. For these kinds of databases, ways to generate classifiers have been described in some of the preceding paragraphs of this invention disclosure.

At step 505, one of the candidate classifiers having the smallest error function c, with reference to the samples is selected.

At step 507, a weight $w_i$ for the newly selected classifier $h_i(\ )$ is calculated as $$w_i = \frac{1}{2}\ln\left(\frac{1-\varepsilon_i}{\varepsilon_i}\right) \quad (4)$$

At step 509, the weights $P_s(c)$, c∈S are updated as $$P_{s+1}(c) = \frac{P_s(c)\exp(-w_i y_c h_i(c))}{Z_i} \quad (5)$$

where $Z_i$ is a normalization factor chosen such that $P_{s+1}(\ )$ is a probability distribution.

At step 511, it is determined whether this is the last iteration. In general, if a pre-defined number of iterations have been processed, or the smallest error function below a threshold has been reached, the iteration may be determined as the last iteration. If no, the process 500 returns to step 503 to execute the next iteration. If yes, the process 500 ends at step 513.

In another example of generating the model, all the generated candidate classifiers $h_1(\ )$ to $h_C(\ )$ are pre-selected by some optimization process. Such an optimization process could be a process of minimizing the error function as described some of the preceding paragraphs of this invention disclosure. The weights $w_1$ to $w_C$ for the classifiers can be determined by minimizing the identifying error $$\sum_{i=1}^{C} \|w_i H_i - Y\|_{Frob} \quad (6)$$

where $H_i$ is a M×U matrix with $H_i(k,j)=h_i(c_{k,j})$, Y is a M×U matrix with $Y(k,j)=y_{k,j}$, and Frob denotes the Frobenius matrix norm measuring the distance of matrices, and the weights are supposed to be non-negative and must sum up to one. Alternatively, the identifying error may also be calculated as $$\left\|\sum_{i=1}^{C} w_i H_i - Y\right\|_{Frob}. \quad (7)$$

In both cases, a Laplacian gradient search may be used to solve the minimization problem. Alternatively, it is also possible to provide a discrete, possibly uniformly spaced set of possible values for the weights $w_1$ to $w_C$ as well as the threshold values for the classifiers $h_1(\ )$ to $h_C(\ )$. The best solution is defined as the solution that either minimizes the expression (6) or (7) above for a specific set of threshold values for the classifiers $h_1(\ )$ to $h_C(\ )$. Here, the weights and the thresholds can be jointly or consecutively determined.

Figure 6:
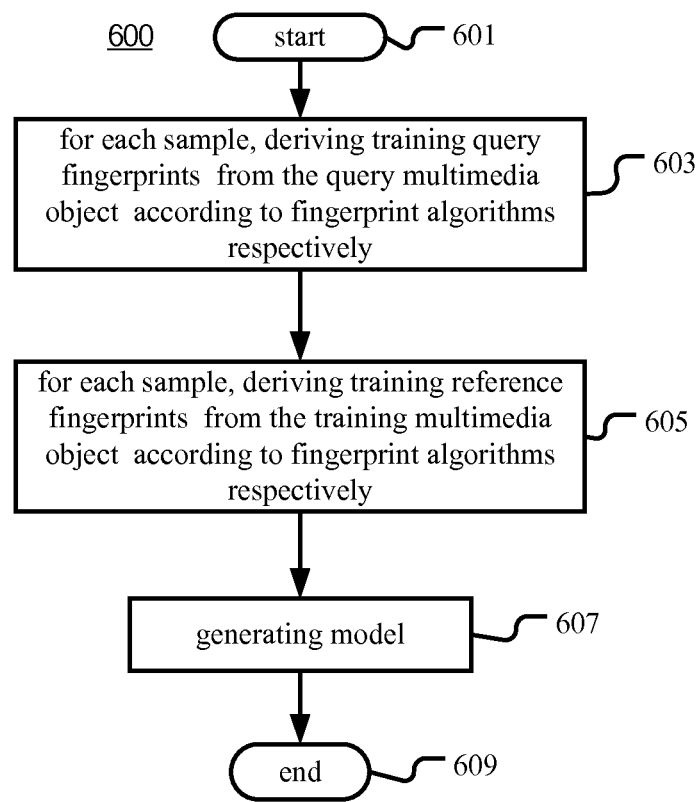
FIG. 6 is a flow chart illustrating an example method of training a model for identifying multimedia objects according to an embodiment of the invention.

FIG. 6 is a flow chart illustrating an example method 600 of training a model for identifying multimedia objects according to an embodiment of the invention.

As illustrated in FIG. 6, the method 600 starts from step 601.

To train the model, a set S of one or more samples is provided. Each sample includes one training query multimedia object $q_k$ of training query multimedia objects $q_1$ to $q_M$, one training reference multimedia object $r_j$ of training reference multimedia objects $r_1$ to $r_U$ and a mark $y_{k,j}$ indicating whether the training query multimedia object $q_k$ matches the training reference multimedia object $r_j$ or not.

At step 603, for each sample, training query fingerprints $f_{q_k,1}$ to $f_{q_k,G}$ are derived from the training query multimedia object $q_k$ according to fingerprint algorithms $F_1$ to $F_G$ respectively. The fingerprint algorithms $F_1$ to $F_G$ are different from each other, and $G>1$.

At step 605, for each sample, training reference fingerprints $f_{r_j,1}$ to $f_{r_j,G}$ are derived from the training reference multimedia object $r_j$ according to the fingerprint algorithms $F_1$ to $F_G$ respectively.

At step 607, for each fingerprint algorithm $F_t$, $1 \leq t \leq G$, at least one candidate classifier is generated based on the training query fingerprints and the training reference fingerprints derived according to the fingerprint algorithm $F_t$. The at least one candidate classifier may include only one candidate classifier, or may include more than one candidate classifier. The candidate classifier is adapted to calculate a decision for any two fingerprints derived according to the fingerprint algorithm $F_t$. The decision indicates a possibility that the two fingerprints are not derived from the same multimedia content. The candidate classifier may be achieved through any algorithm for identifying whether a fingerprint and another fingerprint are derived from the same multimedia content or not. The algorithm includes, but not limited to, identifying algorithms based on machine learning, and identifying algorithms based on searching.

At step 607, also, the model is generated. The model includes a weighted sum of classifiers selected from the candidate classifiers and a threshold $TH_c$ for evaluating the weighted sum, such that the identifying error obtained by applying the model to the query fingerprints and the training fingerprints derived from the samples is minimized. There may be a possibility that in the generated model, the selected classifiers correspond to T>1 fingerprint algorithms. There is also another possibility that in the generated model, the selected classifiers correspond to only one fingerprint algorithm. More than one classifier may correspond to the same fingerprinting algorithm. At step 607, the methods of generating the model described in connection with the apparatus 400 may be adopted.

The method 600 ends at step 609.

In a further embodiment of the apparatus 400 or the method 600, the algorithms for identifying may include any combination of the algorithms described in connection with Examples A, B and C.

In a further embodiment of the apparatus 400 or the method 600, each of the training query multimedia objects includes a number W of objects which are synchronous with each other, and each of the training reference multimedia objects includes the number W of objects which are synchronous with each other, where W>1. For each of the W objects in the training query multimedia objects and the training reference multimedia objects, at least one of the fingerprints is derived from the object according to the same fingerprint algorithm respectively. The W objects may belong to different media classes like audio, video, or image. As an example, the W objects may include an audio object and a video or image object synchronous with each other. Some of the fingerprints may be derived from the audio object, and others may be derived from the video or image object. In this embodiment, fingerprint algorithms suitable for the specific media classes of the objects may be chosen.

In an alternative embodiment of the apparatus 400 or the method 600, it is also possible to provide at least two sets of candidate weights of the selected classifiers in the weighted sum, and select the set of candidate weights resulting in the smallest identifying error (e.g., expression (3), (6) or (7)) as the weights of the selected classifiers in the weighted sum. The identifying errors may be obtained by applying the model configured with the sets of weights to training samples.

Figure 7:
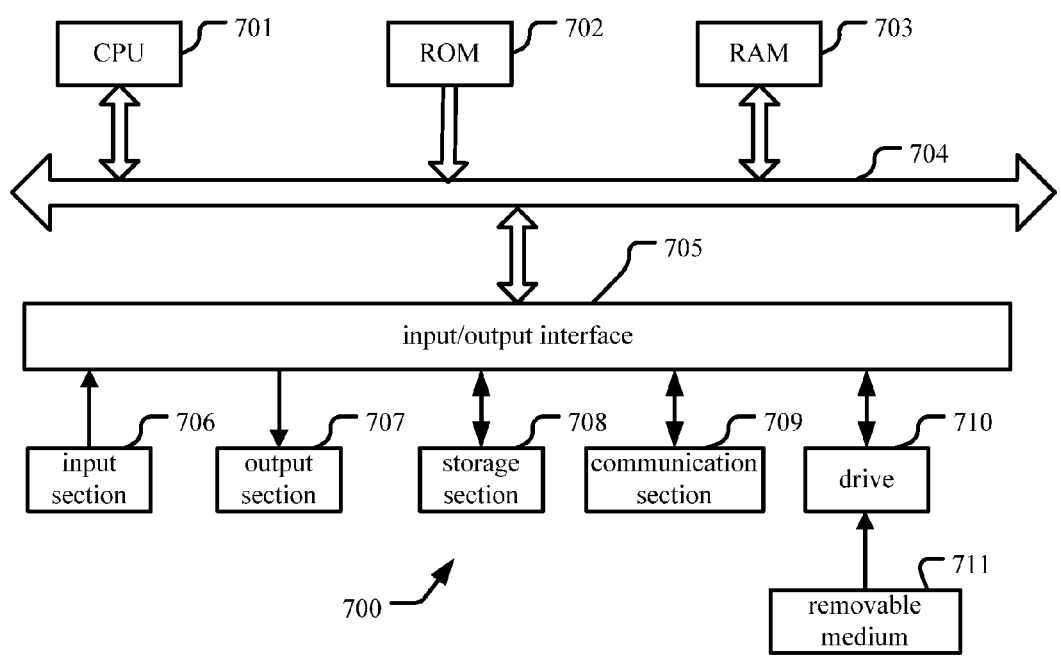
FIG. 7 is a block diagram illustrating an exemplary system for implementing embodiments of the present invention.

FIG. 7 is a block diagram illustrating an exemplary system 700 for implementing embodiments of the present invention.

In FIG. 7, a central processing unit (CPU) 701 performs various processes in accordance with a program stored in a read only memory (ROM) 702 or a program loaded from a storage section 708 to a random access memory (RAM) 703. In the RAM 703, data required when the CPU 701 performs the various processes or the like are also stored as required.

The CPU 701, the ROM 702 and the RAM 703 are connected to one another via a bus 704. An input/output interface 705 is also connected to the bus 704.

The following components are connected to the input/output interface 705: an input section 706 including a keyboard, a mouse, or the like; an output section 707 including a display such as a cathode ray tube (CRT), a liquid crystal display (LCD), or the like, and a loudspeaker or the like; the storage section 708 including a hard disk or the like; and a communication section 709 including a network interface card such as a LAN card, a modem, or the like. The communication section 709 performs a communication process via the network such as the internet.

A drive 710 is also connected to the input/output interface 705 as required. A removable medium 711, such as a magnetic disk, an optical disk, a magneto-optical disk, a semiconductor memory, or the like, is mounted on the drive 710 as required, so that a computer program read therefrom is installed into the storage section 708 as required.

In the case where the above-described steps and processes are implemented by the software, the program that constitutes the software is installed from the network such as the internet or the storage medium such as the removable medium 711.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. A method of identifying a multimedia object, comprising:

acquiring query fingerprints $f_{q,1}$ to $f_{q,T}$ which are derived from the multimedia object according to fingerprint algorithms $F_1$ to $F_T$ respectively, where the fingerprint algorithms $F_1$ to $F_T$ are different from each other, and T>1;

for each fingerprint algorithm $F_t$, calculating decisions through each of at least one classifier corresponding to the fingerprint algorithm $F_t$ based on the query fingerprint and reference fingerprints derived from a plurality of reference multimedia objects according to the fingerprint algorithm $F_t$, each of the decisions indicating a possibility that the query fingerprint and the reference fingerprint for calculating the decision are not derived from the same multimedia content;

for each of the reference multimedia objects, calculating a distance D as a weighted sum of the decisions relating to the reference fingerprints derived from the reference multimedia object according to the fingerprint algorithms $F_1$ to $F_T$ respectively; and identifying the multimedia object as matching the reference multimedia object with the smallest distance which is less than a threshold $TH_c$.

EE 2. The method according to EE 1, wherein for each of the fingerprint algorithms, the at least one classifier comprises only one classifier.

EE 3. The method according to EE 1, wherein for each of at least one of the classifiers, the calculating of the decisions through the classifier based on the query fingerprint and the reference fingerprints comprises:

searching a tree to find at least one leaf node having an bit error rate between the query fingerprint and the reference fingerprint represented by the leaf node less than a maximum tolerable error rate; and calculating the decisions by deciding that only the reference fingerprints represented by the at least one leaf node and the query fingerprint are derived from the same multimedia content, wherein the reference fingerprints have a fixed length L=S×K bits, and S and K are positive integers, wherein the tree is a $2^K$-ary tree having S levels, and each node in the l-th level, 0≤l≤S, represents a bit sequence of K×l bits, wherein each level has a look-up table defining an estimated bit error rate between the query fingerprint and its closest reference fingerprint under a reached node of the level, such that the probability of observing at least E errors between b bits represented by the reached node and first b bits of the query fingerprint is greater than a threshold $p_t$.

EE 4. The method according to EE 3, wherein the at least one leaf node comprises only one leaf node.

EE 5. The method according to EE 4, wherein the only one leaf node has the smallest bit error rate.

EE 6. The method according to EE 1, wherein for each of at least one of the classifiers, the fingerprints for the classifier are derived as hash values, and the calculating of the decisions through the classifier based on the query fingerprint and the reference fingerprints comprises:

calculating a distance d between the query fingerprint and each of the reference fingerprints; and calculating the decisions by deciding that at least one of the reference fingerprints with the distance d less than a threshold and the query fingerprint are derived from the same multimedia content.

EE 7. The method according to EE 3, wherein for each of at least one of the classifiers, the fingerprints for the classifier are derived as hash values, and the calculating of the decisions through the classifier based on the query fingerprint and the reference fingerprints comprises:

calculating a distance d between the query fingerprint and each of the reference fingerprints; and calculating the decisions by deciding that at least one of the reference fingerprints with the distance d less than a threshold and the query fingerprint are derived from the same multimedia content.

EE 8. The method according to EE 1, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the calculating of the decisions through the classifier based on the query fingerprint and the reference fingerprints comprises:

calculating a distance d between the query fingerprint and each of the reference fingerprints having the identical reliable bits; and calculating the decisions by deciding that at least one of the reference fingerprints with the distance d less than a threshold and the query fingerprint are derived from the same multimedia content.

EE 9. The method according to EE 3, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the calculating of the decisions through the classifier based on the query fingerprint and the reference fingerprints comprises:

calculating a distance d between the query fingerprint and each of the reference fingerprints having the identical reliable bits; and calculating the decisions by deciding that at least one of the reference fingerprints with the distance d less than a threshold and the query fingerprint are derived from the same multimedia content.

EE 10. The method according to EE 6, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the calculating of the decisions through the classifier based on the query fingerprint and the reference fingerprints comprises:

calculating a distance d between the query fingerprint and each of the reference fingerprints having the identical reliable bits; and calculating the decisions by deciding that at least one of the reference fingerprints with the distance d less than a threshold and the query fingerprint are derived from the same multimedia content.

EE 11. The method according to EE 7, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the calculating of the decisions through the classifier based on the query fingerprint and the reference fingerprints comprises:

calculating a distance d between the query fingerprint and each of the reference fingerprints having the identical reliable bits; and calculating the decisions by deciding that at least one of the reference fingerprints with the distance d less than a threshold and the query fingerprint are derived from the same multimedia content.

EE 12. The method according to EE 1, wherein the multimedia object includes a number W of objects which are synchronous with each other, and each of the reference multimedia objects includes the number W of objects which are synchronous with each other, where W>1, and wherein for each of the W objects in the multimedia object and the reference multimedia objects, at least one of the fingerprints is derived from the object according to the same fingerprint algorithm respectively.

EE 13. The method according to EE 12, wherein the number W of objects include an audio object and a video or image object and audio fingerprints are taken from audio objects and video or image fingerprints are taken from video or image objects.

EE 14. An apparatus for identifying a multimedia object, comprising:

an acquiring unit configured to acquire query fingerprints $f_{q,1}$ to $f_{q,T}$ which are derived from the multimedia object according to fingerprint algorithms $F_1$ to $F_T$ respectively, where the fingerprint algorithms $F_1$ to $F_T$ are different from each other, and T>1;

a plurality of classifying units, wherein each fingerprint algorithm $F_t$ corresponds to at least one of the classifying units, and each of the classifying units is configured to calculate decisions through a classifier based on the query fingerprint and reference fingerprints derived from a plurality of reference multimedia objects according to the fingerprint algorithm $F_t$, each of the decisions indicating a possibility that the query fingerprint and the reference fingerprint for calculating the decision are not derived from the same multimedia content; and a combining unit configured to, for each of the reference multimedia objects, calculate a distance D as a weighted sum of the decisions relating to the reference fingerprints derived from the reference multimedia object according to the fingerprint algorithms $F_1$ to $F_T$ respectively; and an identifying unit configured to identify the multimedia object as matching the reference multimedia object with the smallest distance which is less than a threshold $TH_c$.

EE 15. The apparatus according to EE 14, wherein each fingerprint algorithms $F_t$ corresponds to only one of the classifying units.

EE 16. The apparatus according to EE 14, wherein for each of at least one of the classifiers, the corresponding classifying unit is further configured to calculate the decisions through the classifier based on the query fingerprint and the reference fingerprints by:

searching a tree to find at least one leaf node having an bit error rate between the query fingerprint and the reference fingerprint represented by the leaf node less than a maximum tolerable error rate; and calculating the decisions by deciding that only the reference fingerprint represented by the at least one leaf node and the query fingerprint are derived from the same multimedia content, wherein the reference fingerprints have a fixed length L=S×K bits, and S and K are positive integers, wherein the tree is a $2^K$-ary tree having S levels, and each node in the l-th level, 0≤l≤S, represents a bit sequence of K×l bits, wherein each level has a look-up table defining an estimated bit error rate between the query fingerprint and its closest reference fingerprint under a reached node of the level, such that the probability of observing at least E errors between b bits represented by the reached node and first b bits of the query fingerprint is greater than a threshold $p_t$.

EE 17. The apparatus according to EE 16, wherein the at least one leaf node comprises only one leaf node.

EE 18. The apparatus according to EE 17, wherein the only one leaf node has the smallest bit error rate.

EE 19. The apparatus according to EE 14, wherein for each of at least one of the classifiers, the fingerprints for the classifier are derived as hash values, and the corresponding classifying unit is further configured to calculate the decisions through the classifier based on the query fingerprint and the reference fingerprints by:

calculating a distance d between the query fingerprint and each of the reference fingerprints; and calculating the decisions by deciding that at least one of the reference fingerprints with the distance d less than a threshold and the query fingerprint are derived from the same multimedia content.

EE 20. The apparatus according to EE 16, wherein for each of at least one of the classifiers, the fingerprints for the classifier are derived as hash values, and the corresponding classifying unit is further configured to calculate the decisions through the classifier based on the query fingerprint and the reference fingerprints by:

calculating a distance d between the query fingerprint and each of the reference fingerprints; and calculating the decisions by deciding that at least one of the reference fingerprints with the distance d less than a threshold and the query fingerprint are derived from the same multimedia content.

EE 21. The apparatus according to EE 14, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the corresponding classifying unit is further configured to calculate the decisions through the classifier based on the query fingerprint and the reference fingerprints by:

calculating a distance d between the query fingerprint and each of the reference fingerprints having the identical reliable bits; and calculating the decisions by deciding that at least one of the reference fingerprint with the distance d less than a threshold and the query fingerprint are derived from the same multimedia content.

EE 22. The apparatus according to EE 16, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the corresponding classifying unit is further configured to calculate the decisions through the classifier based on the query fingerprint and the reference fingerprints by:

calculating a distance d between the query fingerprint and each of the reference fingerprints having the identical reliable bits; and calculating the decisions by deciding that at least one of the reference fingerprint with the distance d less than a threshold and the query fingerprint are derived from the same multimedia content.

EE 23. The apparatus according to EE 19, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the corresponding classifying unit is further configured to calculate the decisions through the classifier based on the query fingerprint and the reference fingerprints by:

calculating a distance d between the query fingerprint and each of the reference fingerprints having the identical reliable bits; and calculating the decisions by deciding that at least one of the reference fingerprint with the distance d less than a threshold and the query fingerprint are derived from the same multimedia content.

EE 24. The apparatus according to EE 20, wherein for each of at least one of the classifiers, the fingerprints for the classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the corresponding classifying unit is further configured to calculate the decisions through the classifier based on the query fingerprint and the reference fingerprints by:

calculating a distance d between the query fingerprint and each of the reference fingerprints having the identical reliable bits; and calculating the decisions by deciding that at least one of the reference fingerprint with the distance d less than a threshold and the query fingerprint are derived from the same multimedia content.

EE 25. The apparatus according to EE 14, wherein the multimedia object includes a number W of objects which are synchronous with each other, and each of the reference multimedia objects includes the number W of objects which are synchronous with each other, where W>1, and wherein for each of the W objects in the multimedia object and the reference multimedia objects, at least one of the fingerprints is derived from the object according to the same fingerprint algorithm respectively.

EE 26. The apparatus according to EE 25, wherein the number W of objects include an audio object and a video or image object, and audio fingerprints are taken from audio objects and video or image fingerprints are taken from video or image objects.

EE 27. A method of training a model for identifying multimedia objects, comprising:

for each of one or more samples including a training query multimedia object, a training reference multimedia object and a mark indicating whether the training query multimedia object matches the training reference multimedia object or not, deriving training query fingerprints from the training query multimedia object according to fingerprint algorithms $F_1$ to $F_G$ respectively, where the fingerprint algorithms $F_1$ to $F_G$ are different from each other, and G>1;

deriving training reference fingerprints from the training reference multimedia object according to the fingerprint algorithms $F_1$ to $F_G$ respectively;

for each fingerprint algorithm $F_f$, generating at least one candidate classifier based on the training query fingerprints and the training reference fingerprints derived according to the fingerprint algorithm $F_f$, the candidate classifier being adapted to calculate a decision for any two fingerprints derived according to the fingerprint algorithm $F_f$, which indicates a possibility that the two fingerprints are not derived from the same multimedia content; and generating the model including a weighted sum of classifiers selected from the candidate classifiers and a threshold $TH_c$ for evaluating the weighted sum such that the identifying error obtained by applying the model to the training query fingerprints and the training reference fingerprints derived from the samples is minimized.

EE 28. The method according to EE 27, wherein the selected classifiers in the generated model correspond to only one fingerprint algorithm.

EE 29. The method according to EE 27, wherein the classifiers are generated and selected through an Adaboost method.

EE 30. The method according to EE 27, wherein weights of the selected classifiers in the weighted sum are determined through the Adaboost method.

EE 31. The method according to EE 27, wherein the generation of the model comprises:

providing at least two sets of candidate weights of the selected classifiers in the weighted sum; and selecting the set of candidate weights resulting in the smallest identifying error as the weights of the selected classifiers in the weighted sum.

EE 32. The method according to EE 27, wherein for each fingerprint algorithm $F_f$, only one classifier is selected.

EE 33. The method according to EE 29, wherein for each fingerprint algorithm $F_f$, only one classifier is selected.

EE 34. The method according to EE 30, wherein for each fingerprint algorithm $F_f$, only one classifier is selected.

EE 35. The method according to EE 31, wherein for each fingerprint algorithm $F_f$, only one classifier is selected.

EE 36. The method according to EE 27, wherein for each of at least one of the candidate classifiers, the candidate classifier is adapted to:

search a tree to find at least one leaf node having an bit error rate between the training query fingerprint and the training reference fingerprint represented by the leaf node less than a maximum tolerable error rate; and calculate the decision by deciding that only the training reference fingerprint represented by the at least one leaf node and the training query fingerprint are derived from the same multimedia content, wherein the training reference fingerprints have a fixed length $L=S \times K$ bits, and S and K are positive integers, wherein the tree is a $2^K$-ary tree having S levels, and each node in the l-th level, $0 \leq l \leq S$, represents a bit sequence of K×l bits, wherein each level has a look-up table defining an estimated bit error rate between the training query fingerprint and its closest training reference fingerprint under a reached node of the level, such that the probability of observing at least E errors between b bits represented by the reached node and first b bits of the training query fingerprint is greater than a threshold $p_t$, wherein at least two sets of parameters including K and an initial value of the maximum tolerable error rate are provided for the tree, and the set resulting in the smallest identifying error is selected to generate the candidate classifier.

EE 37. The method according to EE 36, wherein the at least one leaf node comprises only one leaf node.

EE 38. The method according to EE 37, wherein the only one leaf node has the smallest bit error rate.

EE 39. The method according to EE 27, wherein for each of at least one of the candidate classifiers, the fingerprints for generating the candidate classifier are derived as hash values, and the candidate classifier is adapted to:

calculate a distance d between the training query fingerprint and each of a set of training reference fingerprints, and calculate the decisions by deciding that at least one of the training reference fingerprints with the distance d less than a threshold and the training query fingerprint are derived from the same multimedia content, and wherein at least two candidate thresholds for calculating the decisions are provided and the candidate threshold resulting in the smallest identifying error is selected as the threshold for the candidate classifier.

EE 40. The method according to EE 36, wherein for each of at least one of the candidate classifiers, the fingerprints for generating the candidate classifier are derived as hash values, and the candidate classifier is adapted to:

calculate a distance d between the training query fingerprint and each of a set of training reference fingerprints, and calculate the decisions by deciding that at least one of the training reference fingerprints with the distance d less than a threshold and the training query fingerprint are derived from the same multimedia content, and wherein at least two candidate thresholds for calculating the decisions are provided and the candidate threshold resulting in the smallest identifying error is selected as the threshold for the candidate classifier.

EE 41. The method according to EE 27, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 42. The method according to EE 36, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 43. The method according to EE 39, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 44. The method according to EE 40, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 45. The method according to EE 27, wherein each of the training query multimedia objects includes a number W of objects which are synchronous with each other, and each of the training reference multimedia objects includes the number W of objects which are synchronous with each other, where W>1, and wherein for each of the W objects in the training query multimedia objects and the training reference multimedia objects, at least one of the fingerprints is derived from the object according to the same fingerprint algorithm respectively.

EE 46. The method according to EE 45, wherein the number W of objects include an audio object and a video or image object, and audio fingerprints are taken from audio objects and video or image fingerprints are taken from video or image objects.

EE 47. An apparatus for training a model for identifying multimedia objects, comprising:
a fingerprint calculator configured to, for each of one or more samples including a training query multimedia object, a training reference multimedia object and a mark indicating whether the training query multimedia object matches the training reference multimedia object or not, derive training query fingerprints from the training query multimedia object according to fingerprint algorithms $F_1$ to $F_G$ respectively, where the fingerprint algorithms $F_1$ to $F_G$ are different from each other, and G>1, and derive training reference fingerprints from the training reference multimedia object according to the fingerprint algorithms $F_1$ to $F_G$ respectively; and
a training unit configured to:
for each fingerprint algorithm $F_t$, generate at least one candidate classifier based on the training query fingerprints and the training reference fingerprints derived according to the fingerprint algorithm $F_t$, the candidate classifier being adapted to calculate a decision for any two fingerprints derived according to the fingerprint algorithm $F_t$, which indicates a possibility that the two fingerprints are not derived from the same multimedia content; and
generate the model including a weighted sum of classifiers selected from the candidate classifiers and a threshold $TH_c$ for evaluating the weighted sum such that the identifying error obtained by applying the model to the training query fingerprints and the training reference fingerprints derived from the samples is minimized.

EE 48. The apparatus according to EE 47, wherein the selected classifiers in the generated model correspond to more than one fingerprint algorithm.

EE 49. The apparatus according to EE 46, wherein the classifiers are generated and selected through an Adaboost method.

EE 50. The apparatus according to EE 49, wherein weights of the selected classifiers in the weighted sum are determined through the Adaboost method.

EE 51. The apparatus according to EE 47, wherein the generation of the model comprises:
providing at least two sets of candidate weights of the selected classifiers in the weighted sum; and
selecting the set of candidate weights resulting in the smallest identifying error as the weights of the selected classifiers in the weighted sum.

EE 52. The apparatus according to EE 47, wherein for each fingerprint algorithm $F_t$, only one classifier is selected.

EE 53. The apparatus according to EE 49, wherein for each fingerprint algorithm $F_t$, only one classifier is selected.

EE 54. The apparatus according to EE 50, wherein for each fingerprint algorithm $F_t$, only one classifier is selected.

EE 55. The apparatus according to EE 51, wherein for each fingerprint algorithm $F_t$, only one classifier is selected.

EE 56. The apparatus according to EE 47, wherein
for each of at least one of the candidate classifiers, the candidate classifier is adapted to:
search a tree to find at least one leaf node having an bit error rate between the training query fingerprint and the training reference fingerprint represented by the leaf node less than a maximum tolerable error rate; and
calculate the decision by deciding that only the training reference fingerprint represented by the at least one leaf node and the training query fingerprint are derived from the same multimedia content,
wherein the training reference fingerprints have a fixed length L=S×K bits, and S and K are positive integers,
wherein the tree is a $2^K$-ary tree having S levels, and each node in the l-th level, 0≤l≤S, represents a bit sequence of K×l bits,
wherein each level has a look-up table defining an estimated bit error rate between the training query fingerprint and its closest training reference fingerprint under a reached node of the level, such that the probability of observing at least E errors between b bits represented by the reached node and first b bits of the training query fingerprint is greater than a threshold $p_t$, wherein at least two sets of parameters including K and an initial value of the maximum tolerable error rate are provided for the tree, and the set resulting in the smallest identifying error is selected to generate the candidate classifier.

EE 57. The apparatus according to EE 56, wherein the at least one leaf node comprises only one leaf node.

EE 58. The apparatus according to EE 57, wherein the only one leaf node has the smallest bit error rate.

EE 59. The apparatus according to EE 47, wherein
for each of at least one of the candidate classifiers, the fingerprints for generating the candidate classifier are derived as hash values, and the candidate classifier is adapted to:
calculate a distance d between the training query fingerprint and each of a set of training reference fingerprints, and
calculate the decisions by deciding that at least one of the training reference fingerprints with the distance d less than a threshold and the training query fingerprint are derived from the same multimedia content, and
wherein at least two candidate thresholds for calculating the decisions are provided and the candidate threshold resulting in the smallest identifying error is selected as the threshold for the candidate classifier.

EE 60. The apparatus according to EE 56, wherein
for each of at least one of the candidate classifiers, the fingerprints for generating the candidate classifier are derived as hash values, and the candidate classifier is adapted to:
calculate a distance d between the training query fingerprint and each of a set of training reference fingerprints, and
calculate the decisions by deciding that at least one of the training reference fingerprints with the distance d less than a threshold and the training query fingerprint are derived from the same multimedia content, and
wherein at least two candidate thresholds for calculating the decisions are provided and the candidate threshold resulting in the smallest identifying error is selected as the threshold for the candidate classifier.

EE 61. The apparatus according to EE 47, wherein
for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and
the candidate classifier is adapted to:
calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 62. The apparatus according to EE 56, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 63. The apparatus according to EE 59, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 64. The apparatus according to EE 60, wherein for each of at least one of the candidate classifiers, the fingerprints for generating the candidate classifier are derived as hash values, each of the hash values is divided into weak bits and reliable bits, where the weak bits are likely to flip when the multimedia object, from which the fingerprint is derived, is modified, and the reliable bits are less likely to flip as a result of content modification, and the candidate classifier is adapted to:

calculate a distance d between the training query fingerprint and each of a set of training reference fingerprints having the identical reliable bits, and calculating the decisions by deciding that at least one of the training reference fingerprints with the distance d less than a threshold and the training query fingerprint are derived from the same multimedia content, wherein at least two combinations of threshold for calculating the decisions and division of weak bits and reliable bits are provided and the combination resulting in the smallest identifying error is selected for the candidate classifier.

EE 65. The apparatus according to EE 47, wherein each of the training query multimedia objects includes a number W of objects which are synchronous with each other, and each of the training reference multimedia objects includes the number W of objects which are synchronous with each other, where W>1, and wherein for each of the W objects in the training query multimedia objects and the training reference multimedia objects, at least one of the fingerprints is derived from the object according to the same fingerprint algorithm respectively.

EE 66. The apparatus according to EE 65, wherein the number W of objects include an audio object and a video or image object, and audio fingerprints are taken from audio objects and video or image fingerprints are taken from video or image objects.

EE 67. A computer-readable medium having computer program instructions recorded thereon for enabling a processor to perform a method of identifying a multimedia object, the method comprising:

acquiring query fingerprints $f_{q,1}$ to $f_{q,T}$ which are derived from the multimedia object according to fingerprint algorithms $F_1$ to $F_T$ respectively, where the fingerprint algorithms $F_1$ to $F_T$ are different from each other, and T>1;

for each fingerprint algorithm $F_t$, calculating decisions through each of at least one classifier corresponding to the fingerprint algorithm $F_t$ based on the query fingerprint and reference fingerprints derived from a plurality of reference multimedia objects according to the fingerprint algorithm $F_t$, each of the decisions indicating a possibility that the query fingerprint and the reference fingerprint for calculating the decision are not derived from the same multimedia content;

for each of the reference multimedia objects, calculating a distance D as a weighted sum of the decisions relating to the reference fingerprints derived from the reference multimedia object according to the fingerprint algorithms $F_1$ to $F_T$ respectively; and identifying the multimedia object as matching the reference multimedia object with the smallest distance which is less than a threshold $TH_c$.

EE 68. A computer program product including computer program instructions for enabling a processor to perform a method of identifying a multimedia object, the method comprising:

acquiring query fingerprints $f_{q,1}$ to $f_{q,T}$ which are derived from the multimedia object according to fingerprint algorithms $F_1$ to $F_T$ respectively, where the fingerprint algorithms $F_1$ to $F_T$ are different from each other, and T>1;

for each fingerprint algorithm $F_t$, calculating decisions through each of at least one classifier corresponding to the fingerprint algorithm $F_t$ based on the query fingerprint and reference fingerprints derived from a plurality of reference multimedia objects according to the fingerprint algorithm $F_t$, each of the decisions indicating a possibility that the query fingerprint and the reference fingerprint for calculating the decision are not derived from the same multimedia content;

for each of the reference multimedia objects, calculating a distance D as a weighted sum of the decisions relating to the reference fingerprints derived from the reference multimedia object according to the fingerprint algorithms $F_1$ to $F_T$ respectively; and identifying the multimedia object as matching the reference multimedia object with the smallest distance which is less than a threshold $TH_c$.

EE 69. A computer-readable medium having computer program instructions recorded thereon for enabling a processor to perform a method of training a model for identifying multimedia objects, the method comprising:

for each of one or more samples including a training query multimedia object, a training reference multimedia object and a mark indicating whether the training query multimedia object matches the training reference multimedia object or not, deriving training query fingerprints from the training query multimedia object according to fingerprint algorithms $F_1$ to $F_G$ respectively, where the fingerprint algorithms $F_1$ to $F_G$ are different from each other, and $G>1$;

deriving training reference fingerprints from the training reference multimedia object according to the fingerprint algorithms $F_1$ to $F_G$ respectively; and for each fingerprint algorithm $F_t$, generating at least one candidate classifier based on the training query fingerprints and the training reference fingerprints derived according to the fingerprint algorithm $F_t$, the candidate classifier being adapted to calculate a decision for any two fingerprints derived according to the fingerprint algorithm $F_t$, which indicates a possibility that the two fingerprints are not derived from the same multimedia content;

generating the model including a weighted sum of classifiers selected from the candidate classifiers and a threshold $TH_c$ for evaluating the weighted sum such that the identifying error obtained by applying the model to the training query fingerprints and the training reference fingerprints derived from the samples is minimized.

EE 70. A computer program product including computer program instructions for enabling a processor to perform a method of training a model for identifying multimedia objects, the method comprising:

for each of one or more samples including a training query multimedia object, a training reference multimedia object and a mark indicating whether the training query multimedia object matches the training reference multimedia object or not, deriving training query fingerprints from the training query multimedia object according to fingerprint algorithms $F_1$ to $F_G$ respectively, where the fingerprint algorithms $F_1$ to $F_G$ are different from each other, and $G>1$;

deriving training reference fingerprints from the training reference multimedia object according to the fingerprint algorithms $F_1$ to $F_G$ respectively; and for each fingerprint algorithm $F_t$, generating at least one candidate classifier based on the training query fingerprints and the training reference fingerprints derived according to the fingerprint algorithm $F_t$, the candidate classifier being adapted to calculate a decision for any two fingerprints derived according to the fingerprint algorithm $F_t$, which indicates a possibility that the two fingerprints are not derived from the same multimedia content;

generating the model including a weighted sum of classifiers selected from the candidate classifiers and a threshold $TH_c$ for evaluating the weighted sum such that the identifying error obtained by applying the model to the training query fingerprints and the training reference fingerprints derived from the samples is minimized

We claim:

1. An apparatus for identifying a multimedia object, comprising:

an acquiring unit, implemented at least in part by one or more computing processors, that acquires query fingerprints $f_{q,1}$ to $f_{q,T}$ which are derived from the multimedia object according to fingerprint algorithms $F_1$ to $F_T$ respectively, where the fingerprint algorithms $F_1$ to $F_T$ are different from each other, and $T>1$;

a plurality of classifying units, wherein each fingerprint algorithm $F_t$ corresponds to at least one of the classifying units, and each of the classifying units, implemented at least in part by one or more computing processors, calculates decisions through a classifier based on the query fingerprint $f_{q,t}$ and reference fingerprints derived from a plurality of reference multimedia objects according to the fingerprint algorithm $F_t$, each of the decisions indicating a possibility that the query fingerprint and the reference fingerprint for calculating the decision are not derived from the same multimedia content; and a combining unit, implemented at least in part by one or more computing processors, that, for each of the reference multimedia objects, calculates a distance D as a weighted sum of the decisions relating to the reference fingerprints derived from the reference multimedia object according to the fingerprint algorithms $F_1$ to $F_T$ respectively; and an identifying unit, implemented at least in part by one or more computing processors, that identifies the multimedia object as matching the reference multimedia object with the smallest distance which is less than a threshold $TH_c$;

wherein for each of at least one of the classifiers, the corresponding classifying unit further calculates the decisions through the classifier based on the query fingerprint and the reference fingerprints by:

searching a tree to find at least one leaf node having an bit error rate between the query fingerprint and the reference fingerprint represented by the leaf node less than a maximum tolerable error rate; and calculating the decisions by deciding that only the reference fingerprint represented by the at least one leaf node and the query fingerprint are derived from the same multimedia content;

wherein the reference fingerprints have a fixed length $L=S \times K$ bits, and S and K are positive integers;

wherein the tree is a $2^K$-ary tree having S levels, and each node in the l-th level, $0 \leq l \leq S$, represents a bit sequence of $K \times l$ bits;

wherein each level among the S levels has a look-up table defining an estimated bit error rate between the query fingerprint and its closest reference fingerprint under a reached node of the level, such that the probability of observing at least E errors between b bits represented by the reached node and first b bits of the query fingerprint is greater than a threshold $p_t$.

2. The apparatus according to claim 1, wherein each fingerprint algorithms $F_t$ corresponds to only one of the classifying units.

3. The apparatus according to claim 1, wherein the multimedia object includes a number W of objects which are synchronous with each other, and each of the reference multimedia objects includes the number W of objects which are synchronous with each other, where $W>1$, and wherein for each of the W objects in the multimedia object and the reference multimedia objects, at least one of the fingerprints is derived from the object according to the same fingerprint algorithm respectively.

4. An apparatus for training a model for identifying multimedia objects, comprising:

a fingerprint calculator, implemented at least in part by one or more computing processors, that, for each of one or more samples including a training query multimedia object, a training reference multimedia object and a mark indicating whether the training query multimedia object matches the training reference multimedia object or not, derive training query fingerprints from the training query multimedia object according to fingerprint algorithms $F_1$ to $F_G$ respectively, where the fingerprint algorithms $F_1$ to $F_G$ are different from each other, and G>1, and derives training reference fingerprints from the training reference multimedia object according to the fingerprint algorithms $F_1$ to $F_G$ respectively; and a training unit, implemented at least in part by one or more computing processors, that:

for each fingerprint algorithm $F_t$, generates at least one candidate classifier based on the training query fingerprints and the training reference fingerprints derived according to the fingerprint algorithm $F_t$, the candidate classifier being adapted to calculate a decision for any two fingerprints derived according to the fingerprint algorithm $F_t$, which indicates a possibility that the two fingerprints are not derived from the same multimedia content; and generates the model including a weighted sum of classifiers selected from the candidate classifiers and a threshold $TH_c$ for evaluating the weighted sum such that the identifying error obtained by applying the model to the training query fingerprints and the training reference fingerprints derived from the samples is minimized;

wherein for each of at least one of the candidate classifiers, the candidate classifier is adapted to:

search a tree to find at least one leaf node having an bit error rate between the training query fingerprint and the training reference fingerprint represented by the leaf node less than a maximum tolerable error rate; and calculate the decision by deciding that only the training reference fingerprint represented by the at least one leaf node and the training query fingerprint are derived from the same multimedia content;

wherein the training reference fingerprints have a fixed length L=S×K bits, and S and K are positive integers;

wherein the tree is a $2^K$-ary tree having S levels, and each node in the l-th level, 0≤l≤S, represents a bit sequence of K×l bits;

wherein each level among the S levels has a look-up table defining an estimated bit error rate between the training query fingerprint and its closest training reference fingerprint under a reached node of the level, such that the probability of observing at least E errors between b bits represented by the reached node and first b bits of the training query fingerprint is greater than a threshold $p_t$, wherein at least two sets of parameters including K and an initial value of the maximum tolerable error rate are provided for the tree, and the set resulting in the smallest identifying error is selected to generate the candidate classifier.

5. The apparatus according to claim 4, wherein the selected classifiers in the generated model correspond to more than one fingerprint algorithm.

6. The apparatus according to claim 4, wherein the classifiers are generated and selected through an Adaboost method.

7. The apparatus according to claim 6, wherein weights of the selected classifiers in the weighted sum are determined through the Adaboost method.

8. The apparatus according to claim 6, wherein for each fingerprint algorithm $F_t$, only one classifier is selected.

9. The apparatus according to claim 4, wherein the generation of the model comprises:

providing at least two sets of candidate weights of the selected classifiers in the weighted sum; and selecting the set of candidate weights resulting in the smallest identifying error as the weights of the selected classifiers in the weighted sum.

10. The apparatus according to claim 4, wherein for each fingerprint algorithm $F_t$, only one classifier is selected.

11. The apparatus according to claim 4, wherein each of the training query multimedia objects includes a number W of objects which are synchronous with each other, and each of the training reference multimedia objects includes the number W of objects which are synchronous with each other, where W>1, and wherein for each of the W objects in the training query multimedia objects and the training reference multimedia objects, at least one of the fingerprints is derived from the object according to the same fingerprint algorithm respectively.

12. A method of identifying a multimedia object, comprising:

acquiring query fingerprints $f_{q,1}$ to $f_{q,T}$ which are derived from the multimedia object according to fingerprint algorithms $F_1$ to $F_T$ respectively, where the fingerprint algorithms $F_1$ to $F_T$ are different from each other, and T>1;

for each fingerprint algorithm $F_t$, calculating decisions through each of at least one classifier corresponding to the fingerprint algorithm $F_t$ based on the query fingerprint $f_{q,t}$ and reference fingerprints derived from a plurality of reference multimedia objects according to the fingerprint algorithm $F_t$, each of the decisions indicating a possibility that the query fingerprint and the reference fingerprint for calculating the decision are not derived from the same multimedia content;

for each of the reference multimedia objects, calculating a distance D as a weighted sum of the decisions relating to the reference fingerprints derived from the reference multimedia object according to the fingerprint algorithms $F_1$ to $F_T$ respectively; and identifying the multimedia object as matching the reference multimedia object with the smallest distance which is less than a threshold $TH_c$;

wherein for each of at least one of the classifiers, the decisions are calculated through the classifier based on the query fingerprint and the reference fingerprints by:

searching a tree to find at least one leaf node having an bit error rate between the query fingerprint and the reference fingerprint represented by the leaf node less than a maximum tolerable error rate; and calculating the decisions by deciding that only the reference fingerprint represented by the at least one leaf node and the query fingerprint are derived from the same multimedia content;

wherein the reference fingerprints have a fixed length L=S×K bits, and S and K are positive integers;

wherein the tree is a $2^K$-ary tree having S levels, and each node in the l-th level, 0≤l≤S, represents a bit sequence of K×l bits;

wherein each level among the S levels has a look-up table defining an estimated bit error rate between the query fingerprint and its closest reference fingerprint under a reached node of the level, such that the probability of observing at least E errors between b bits represented by the reached node and first b bits of the query fingerprint is greater than a threshold $p_t$.

13. The method according to claim 12, wherein each fingerprint algorithms $F_t$ corresponds to only one classifying unit.

14. The method according to claim 12, wherein the multimedia object includes a number W of objects which are synchronous with each other, and each of the reference multimedia objects includes the number W of objects which are synchronous with each other, where W>1, and
wherein for each of the W objects in the multimedia object and the reference multimedia objects, at least one of the fingerprints is derived from the object according to the same fingerprint algorithm respectively.

15. A method of training a model for identifying multimedia objects, comprising:
for each of one or more samples including a training query multimedia object, a training reference multimedia object and a mark indicating whether the training query multimedia object matches the training reference multimedia object or not,
deriving training query fingerprints from the training query multimedia object according to fingerprint algorithms $F_1$ to $F_G$ respectively, where the fingerprint algorithms $F_1$ to $F_G$ are different from each other, and G>1;
deriving training reference fingerprints from the training reference multimedia object according to the fingerprint algorithms $F_1$ to $F_G$ respectively; and
for each fingerprint algorithm $F_t$, generating at least one candidate classifier based on the training query fingerprints and the training reference fingerprints derived according to the fingerprint algorithm $F_t$, the candidate classifier being adapted to calculate a decision for any two fingerprints derived according to the fingerprint algorithm $F_t$, which indicates a possibility that the two fingerprints are not derived from the same multimedia content;
generating the model including a weighted sum of classifiers selected from the candidate classifiers and a threshold $TH_c$ for evaluating the weighted sum such that the identifying error obtained by applying the model to the training query fingerprints and the training reference fingerprints derived from the samples is minimized;
wherein for each of at least one of the candidate classifiers, the candidate classifier is adapted to:
search a tree to find at least one leaf node having an bit error rate between the training query fingerprint and the training reference fingerprint represented by the leaf node less than a maximum tolerable error rate; and
calculate the decision by deciding that only the training reference fingerprint represented by the at least one leaf node and the training query fingerprint are derived from the same multimedia content;
wherein the training reference fingerprints have a fixed length L=S×K bits, and S and K are positive integers;
wherein the tree is a $2^K$-ary tree having S levels, and each node in the l-th level, 0≤l≤S, represents a bit sequence of K×l bits;
wherein each level among the S levels has a look-up table defining an estimated bit error rate between the training query fingerprint and its closest training reference fingerprint under a reached node of the level, such that the probability of observing at least E errors between b bits represented by the reached node and first b bits of the training query fingerprint is greater than a threshold $p_t$, wherein at least two sets of parameters including K and an initial value of the maximum tolerable error rate are provided for the tree, and the set resulting in the smallest identifying error is selected to generate the candidate classifier.

16. The method according to claim 15, wherein the selected classifiers in the generated model correspond to more than one fingerprint algorithm.

17. The method according to claim 15, wherein the classifiers are generated and selected through an Adaboost method.

18. The method according to claim 17, wherein weights of the selected classifiers in the weighted sum are determined through the Adaboost method.

19. The method according to claim 17, wherein for each fingerprint algorithm $F_t$, only one classifier is selected.

20. The method according to claim 15, wherein the generation of the model comprises:
providing at least two sets of candidate weights of the selected classifiers in the weighted sum; and
selecting the set of candidate weights resulting in the smallest identifying error as the weights of the selected classifiers in the weighted sum.

21. The method according to claim 15, wherein for each fingerprint algorithm $F_t$, only one classifier is selected.

22. The method according to claim 15, wherein each of the training query multimedia objects includes a number W of objects which are synchronous with each other, and each of the training reference multimedia objects includes the number W of objects which are synchronous with each other, where W>1, and
wherein for each of the W objects in the training query multimedia objects and the training reference multimedia objects, at least one of the fingerprints is derived from the object according to the same fingerprint algorithm respectively.

* * * * *